US008077277B2

United States Patent
Ojima et al.

(10) Patent No.: US 8,077,277 B2
(45) Date of Patent: Dec. 13, 2011

(54) LIQUID CRYSTAL DISPLAY DEVICE COMPRISING A FIRST OPTICAL COMPENSATING MEMBER DISPOSED WITHOUT A BIREFRINGENT MEDIUM SANDWICHED BETWEEN THE LIQUID CRYSTAL LAYER AND THE FIRST OPTICAL COMPENSATING MEMBER

(75) Inventors: Kentaro Ojima, Hitachi (JP); Daisuke Kajita, Hitachi (JP); Ikuo Hiyama, Hitachinaka (JP); Masahiro Ishii, Chiba (JP)

(73) Assignees: Hitachi Displays, Ltd., Chiba-ken (JP); Panasonic Liquid Crystal Display Co., Ltd., Hyogo-ken (JP)

(*) Notice: Subject to any disclaimer, the term of this patent is extended or adjusted under 35 U.S.C. 154(b) by 539 days.

(21) Appl. No.: 12/136,134

(22) Filed: Jun. 10, 2008

(65) Prior Publication Data

US 2008/0309858 A1 Dec. 18, 2008

(30) Foreign Application Priority Data

Jun. 15, 2007 (JP) ................................. 2007-158142

(51) Int. Cl.
*G02F 1/1335* (2006.01)
(52) U.S. Cl. ......... 349/118; 349/120; 349/121; 349/107
(58) Field of Classification Search .................. 349/117, 349/118, 119, 120, 121
See application file for complete search history.

(56) References Cited

U.S. PATENT DOCUMENTS

| 4,345,249 | A | 8/1982 | Togashi |
| 2005/0068480 | A1 | 3/2005 | Hiyama et al. |
| 2005/0140900 | A1* | 6/2005 | Jeon et al. ..................... 349/141 |
| 2005/0206817 | A1 | 9/2005 | Kajita et al. |
| 2006/0176424 | A1 | 8/2006 | Kajita et al. |
| 2007/0076144 | A1* | 4/2007 | Okita et al. ................... 349/107 |
| 2010/0007822 | A1 | 1/2010 | Itadani et al. |

FOREIGN PATENT DOCUMENTS

| JP | 09-080424 | 3/1997 |
| JP | 2982869 | 9/1999 |

(Continued)

OTHER PUBLICATIONS

D.W. Berreman, "Optical in Stratifield and Anistrophic Media: 4×4-Matrix Formulation", J. Opt. Soc. Am., vol. 62, No. 4, pp. 502-510, 1972.

*Primary Examiner* — Mark Robinson
*Assistant Examiner* — Dennis Y Kim
(74) *Attorney, Agent, or Firm* — Antonelli, Terry, Stout & Kraus, LLP.

(57) ABSTRACT

A liquid crystal display device comprising a first optical compensating member disposed without a birefringent medium sandwiched between a liquid-crystal layer and the first optical compensating member. The first optical compensating member is constructed so that when a refractive index thereof in a slow-axis direction in a plane parallel to the substrate is taken as n1, a refractive index in a fast-axis direction in the plane parallel to the substrate is taken as n2, and a refractive index in a thickness direction is taken as n3, the first optical compensating member satisfies n1~n3>n2 and a slow axis thereof in the plane parallel to the substrate is substantially vertical to an optical axis of the liquid-crystal layer.

3 Claims, 25 Drawing Sheets

FOREIGN PATENT DOCUMENTS

| | | |
|---|---|---|
| JP | 2000-107247 | 4/2000 |
| JP | 2001-056476 | 2/2001 |
| JP | 3204182 | 6/2001 |
| JP | 2001-350022 | 12/2001 |
| JP | 2002-039290 | 2/2002 |
| JP | 2005-003733 | 1/2005 |
| JP | 2005-21082 | 1/2005 |
| JP | 2005-31217 | 2/2005 |
| JP | 2005-115184 | 4/2005 |
| JP | 2005-128498 | 5/2005 |
| JP | 2005-208356 | 8/2005 |
| JP | 2005-222062 | 8/2005 |
| JP | 2006-220680 | 8/2006 |

* cited by examiner

S1=cosLacosLo
S2=cosLasinLo
S3=cosLa

S0=<|Ex|2>+<|Ey|2>
S1=<|Ex|2>−<|Ey|2>
S2=<2ExEycos $\delta$ >
S3=<2ExEysin $\delta$ >

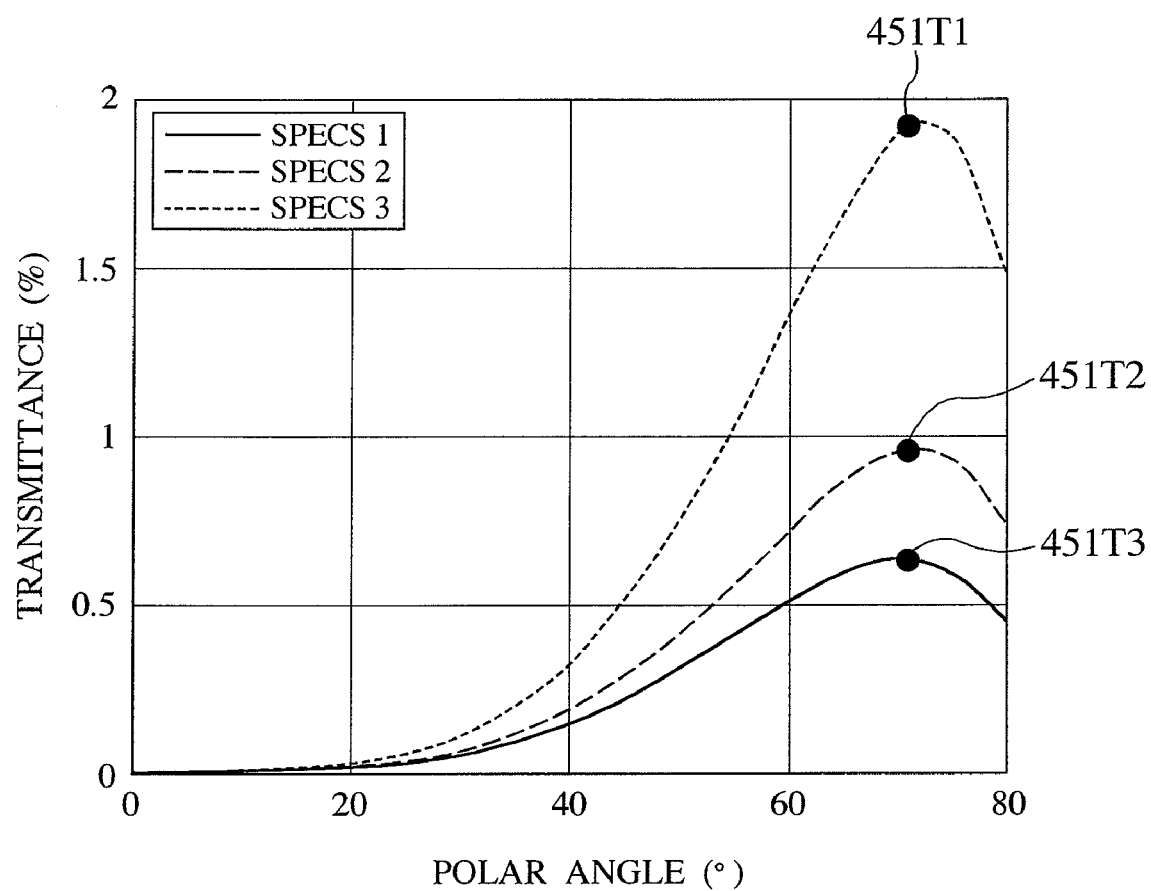

LIQUID CRYSTAL DISPLAY DEVICE COMPRISING A FIRST OPTICAL COMPENSATING MEMBER DISPOSED WITHOUT A BIREFRINGENT MEDIUM SANDWICHED BETWEEN THE LIQUID CRYSTAL LAYER AND THE FIRST OPTICAL COMPENSATING MEMBER

BACKGROUND OF THE INVENTION

1. Field of the Invention

The present invention relates to a liquid crystal display device having a liquid-crystal layer sandwiched between one pair of substrates.

2. Description of the Related Art

In Patent Documents 1, 2, and 3 listed below, a scheme with comb-like electrodes provided on one substrate is proposed as a scheme in which an electric field is applied to a liquid crystal on the substrate horizontally. This scheme is hereinafter referred to as the horizontal field scheme or in-plane switching (IPS) mode. In this scheme, the liquid-crystal molecules rotate in a parallel plane with respect primarily to the substrate. It is known, therefore, that a wide viewing angle can be obtained since, when the crystal is viewed obliquely, the difference in birefringent index between the application of the electric field and non-application thereof is insignificant.

At the same time, it is also seen that in the IPS mode, although changes in the birefringent index of the crystal itself are insignificant, the characteristics of polarizers cause light to leak when the crystal is viewed from the azimuthally oblique directions shifted from the absorption axes of the polarizers. A scheme that employs retardation films to prevent such leakage of light from the oblique directions of polarizers is disclosed in Patent Document 4. In this document, however, although consideration is given to reducing the influence of the liquid crystal in a vertical alignment (VA) mode by improving only the viewing angles of the polarizers, no description is given of compensating for the influence of the liquid-crystal layer in the IPS mode.

In Patent Document 5, while a means for solving the problem that white changes in color according to the particular viewing direction is disclosed, the improvement of black display characteristics is not described.

Meanwhile, a configuration with a retardation film disposed inside one of multiple polarizers in order to improve the viewing angle characteristics of black display is disclosed in Patent Document 6. This scheme also allows for the influence of the triacetylcellulose (TAC) disposed as a supporting base material on both sides of the polarizer. It has been found during the present inventors' studies, however, that the configuration with one phase compensator at one side does not merely cause black to sink sufficiently, but does not reduce changes in color due to the wavelength dispersion of the liquid-crystal layer, either. In addition, the difference in phase compensation due to whether the alignment axis (slow axis) of the liquid-crystal molecules during black display is parallel or perpendicular to the absorption axis of the polarizer at the incident side is not described in Patent Document 6. In the known examples described above, the viewing angle characteristics are discussed in terms of luminance characteristics only and no measures against the color change are disclosed.

Furthermore, a configuration that includes substantially an optically isotropic supporting base material in one polarizer and a retardation film in another polarizer in order to improve the oblique luminance disturbance and/or oblique color disturbance of black display is disclosed in Patent Document 7. The present inventors have studied this scheme to find that although the scheme makes it possible to eliminate the influence of the wavelength dispersion of a liquid-crystal layer, the display device itself is not constructed to reduce changes in color due to the wavelength dispersion of a retardation film.

Patent Document 1: JP-B-S63-21907
Patent Document 2: JP-A-H09-80424
Patent Document 3: JP-A-2001-056476
Patent Document 4: JP-A-2001-350022
Patent Document 5: Japanese Patent No. 3204182
Patent Document 6: Japanese Patent No. 2982869
Patent Document 7: JP-A-2005-208356
Patent Document 8: JP-A-2005-3733
Non-Patent Document 1: "Crystal Optics", compiled by the Japan Society of Applied Physics, KOUGAKU-KONWA-KAI, published by Morikita Publishing Co., Ltd., 1984, 1st Edition, 4th Print, Chapter 5, pp. 102-163
Non-Patent Document 2: "Fundamental Engineering", Gendaikougakusha, 1999, 3rd Edition, Chapter 4, p. 210
Non-Patent Document 3: J. Opt. Soc. Am. paper entitled "Optical in Stratified and Anisotropic Media: 4×4-Matrix Formulation", written by D. W. Berreman, 1972, Volume 62, No. 4, pp. 502-510

SUMMARY OF THE INVENTION

The problem to be solved is that a liquid crystal display device of an in-plane switching (IPS) mode that has liquid-crystal molecules homogeneously aligned during black display and controls transmission and cutoff of light by applying a horizontal electric field to the liquid-crystal molecules suffers a luminance disturbance and color disturbance in an oblique direction.

The IPS mode employs homogeneously aligned liquid-crystal molecules and two polarizers arranged so that the absorption axis of one polarizer pointing in a vertical direction with respect to the front of a screen and the absorption axis of the other polarizer pointing in a horizontal direction are orthogonalized. When the screen is viewed obliquely from the vertical and horizontal directions, the absorption axes of the two polarizers take a positional relationship in which the absorption axes are orthogonal to each other. Black luminance can, therefore, be sufficiently reduced since the homogeneously aligned liquid-crystal molecules and the absorption axis of one polarizer are parallel. In contrast to this, when the screen is viewed obliquely from a 45° azimuthal direction, since the angle formed between the absorption axes of the two polarizers shifts from 90°, transmitted light causes birefringence and this, in turn, causes leakage light, thus making sufficient reduction of black luminance impossible. Additionally, the amount of oblique leakage light differs according to wavelength and this difference causes a color disturbance. Accordingly, an object of the present invention is to provide means which, in order to obtain appropriate display characteristics at practically every omni-directional angle during black display in the IPS mode, reduces both an increase in luminance of the black display made when a screen is viewed from an oblique direction, and the color disturbance.

The present invention is a liquid crystal display device comprising: a first substrate with a first polarizing layer at an incident side of light; a second substrate with a second polarizing layer at an exit side of the light; a liquid-crystal layer disposed between the first substrate and the second substrate such that respective absorption axes of the polarizing layers on the first and second substrates are substantially vertical to each other (the smaller of two angles formed ranges from 88° to 90°), such that liquid-crystal molecules are substantially parallel to the substrate (the smaller of two angles formed ranges from 0° to 5°), and such that the liquid-crystal layer itself is substantially vertical or substantially parallel to the absorption axis of the first polarizing layer (the smaller of two angles formed ranges from 0° to 2°); a matrix-driven electrode group with one pair of electrodes arranged on a pixelby-pixel basis at a side close to the liquid-crystal layer, on either the first substrate or the second substrate; and a rear-illuminating device; wherein, between the first polarizing layer and the liquid-crystal layer, an optical compensating member is disposed without a birefringent medium (having an optical retardation value of at least 20 nm in a plane parallel to the associated substrate or in a thickness direction of this substrate) sandwiched between the liquid-crystal layer and the optical compensating member, and wherein, when a refractive index of the optical compensating member in a slow-axis direction in the plane parallel to the substrate is taken as n1, a refractive index in a fast-axis direction in the plane parallel to the substrate is taken as n2, and a refractive index in the thickness direction is taken as n3, the optical compensating member satisfies n1≈n3>n2 and a slow axis thereof in the plane parallel to the substrate is substantially vertical to an optical axis of the liquid-crystal layer.

Other means will be described in detail in embodiments.

In the liquid crystal display device of the present invention, it is possible, by including polarizers, a liquid-crystal layer, and an optical compensating member, in the device configuration, and defining respective optical constants of each of these optical members, to lessen impacts of the liquid-crystal layer and optical compensating member under an oblique field and to reduce black luminance and color deterioration in an oblique direction.

BRIEF DESCRIPTION OF THE DRAWINGS

Other objects and advantages of the invention will become apparent from the following description of embodiments with reference to the accompanying drawings in which:

FIG. 15 is a conceptual diagram shown to explain evaluation indices used in the present invention;

DESCRIPTION OF THE PREFERRED EMBODIMENTS

Details of the present invention are described below.

With the rise of liquid-crystal TVs, it is important how a non-self-luminous liquid crystal display device that uses the light emitted from an illuminating device lets the light pass through during white display, and how the display device cuts off the light during black display. The present invention concerns how, when a screen is viewed from an oblique direction, especially, during black display, both luminance and color deterioration are to be reduced at the same time.

Figure 7:
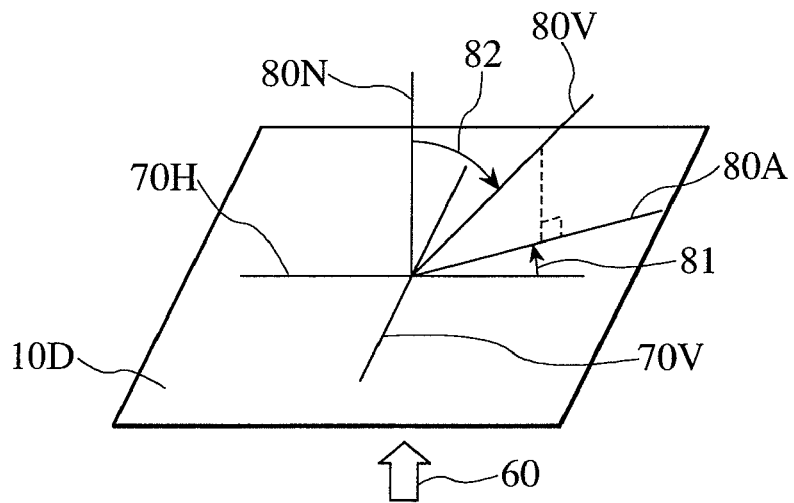
FIG. 7 is a definition diagram explaining a liquid crystal display device of the present invention.

First, prior to description of why luminance increases and color deteriorates during black display when light is viewed from oblique directions, definitions are shown below using FIG. 7. When incident light 60 from the illuminating device enters, then the light is modulated by a liquid-crystal element, and the light exits a display screen 10D, if a normal direction of the display screen 10D is taken as 80N, a horizontal direction as 70H, a vertical direction as 70V, and a projection direction of a viewing direction 80V with respect to the display screen 10D, as 80A, an angle formed between the horizontal direction 70H and 80A is denoted as an azimuthal angle 81 by $\phi$, and an angle formed between the normal direction 80N and the viewing direction 80V is denoted as a polar angle $\theta$.

Figure 9A:
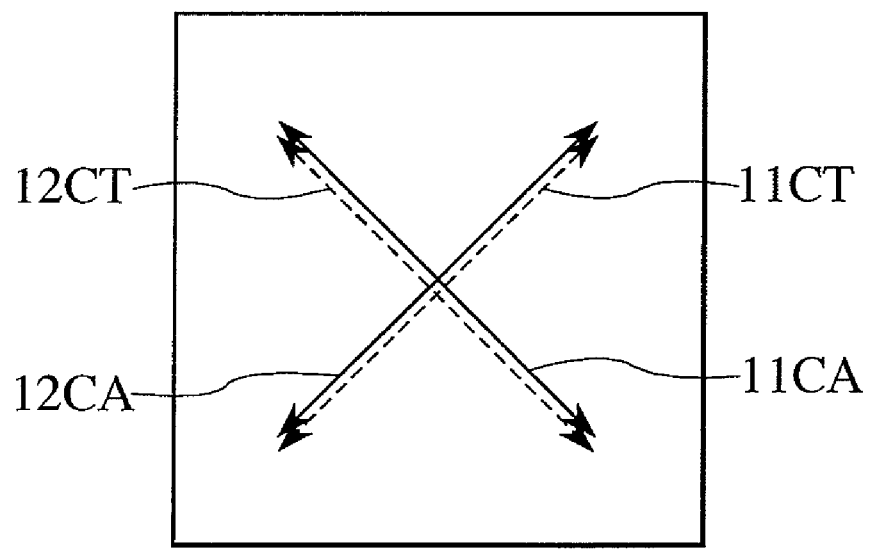
FIGS. 9A and 9B are conceptual diagrams for explaining a liquid crystal display device of the present invention.
Figure 9B:
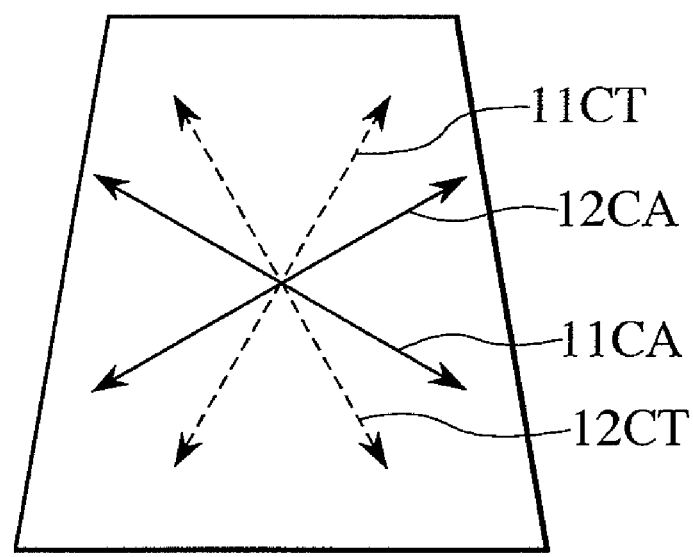

Next, the reason for leakage of light is considered below with the polar angle $\theta$ and azimuthal angle $\phi$ satisfying $\theta \approx 0°$, $\phi \approx 0°$, $180° \pm 90°$, for one pair of orthogonal polarizers. As shown in FIG. 9A, when absorption axes 11BA and 12BA (or transmission axes 11BT and 12BT) of the two polarizers are orthogonalized, light that has entered from the normal direction of the polarizer located at an incident side is formed into linearly polarized light by the polarizer at the incident side and then absorbed into the polarizer at an exit side, thus making black display possible. Meanwhile, as shown in FIG. 9B, the light when viewed from oblique directions ($\theta \approx 0°$, $\phi \approx 0°$, $180° \pm 90°$) has a component parallel to the transmission axis of the polarizer at an opposite side. The light, therefore, is not completely cut off by the polarizer at the opposite side, and the light leaks as a result. In addition, according to studies of the present inventors, when a parallel-aligned liquid-crystal layer is disposed between the orthogonal polarizers, if an optical axis of the liquid-crystal layer is parallel to that of the polarizer at the incident side, the light is not affected by the liquid-crystal layer, but the optical axis thereof suffers a shift, or if the orthogonality of the two polarizers is disturbed, the light is affected by the liquid-crystal layer.

Figure 8:
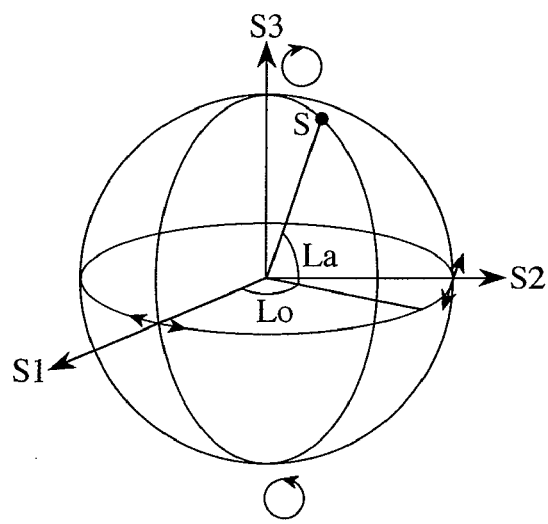
FIG. 8 is a general Poincare ball representation for explaining a liquid crystal display device of the present invention.

These polarized states can better be understood by using Poincare ball representation. The Poincare ball representation is disclosed in Non-Patent Document 4. If Stokes parameters S0, S1, S2, and S3 are plotted in x-axis and y-axis directions on a plane vertical to a traveling direction of the light, respective electric field amplitudes are taken as Ex and Ey, and a relative phase difference between Ex and Ey is defined as $\delta(=\delta y - \delta x)$, the Stokes parameters are represented by $$S0 = <|Ex|2> + <|Ey|2>$$

$$S1 = <|Ex|2> - <|Ey|2>$$

$$S2 = <2ExEy \cos \delta>$$

$$S3 = <2ExEy \sin \delta> \quad \text{(Numerical expression 1)}$$

and $S0^2 = S1^2 + S2^2 + S3^2$ holds for complete polarization. In addition, this relationship, when represented on a Poincare ball, can be expressed as in FIG. 8. That is to say, axes S1, S2, and S3 are taken as axes of a spatially orthogonal coordinate system, and a point S denoting a polarized state is positioned on a spherical surface with a radius of strength S0. When a point of a certain polarized state S is taken and this point is represented using latitude La and longitude Lo, since $S0^2 = S1^2 + S2^2 + S3^2$ holds for complete polarization, if a ball with a radius 1 is considered, the following is obtained:

$$S1 = \cos La \cos Lo$$

$$S2 = \cos La \sin Lo$$

$$S3 = \cos La \quad \text{(Numerical expression 2)}$$

where, on the Poincare ball, clockwise polarized light is disposed on an upper hemisphere, counterclockwise polarized light on a lower hemisphere, linearly polarized light at an equatorial position, rightward circularly polarized light at an upper polar position, and leftward circularly polarized light at a lower polar position.

Figure 10A:
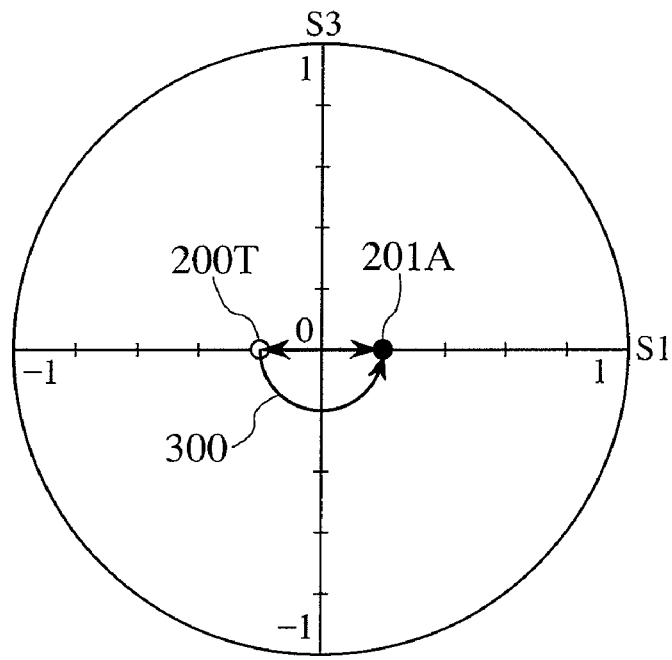
FIGS. 10A and 10B are Poincare ball representations for explaining a liquid crystal display device of the present invention.
Figure 10B:
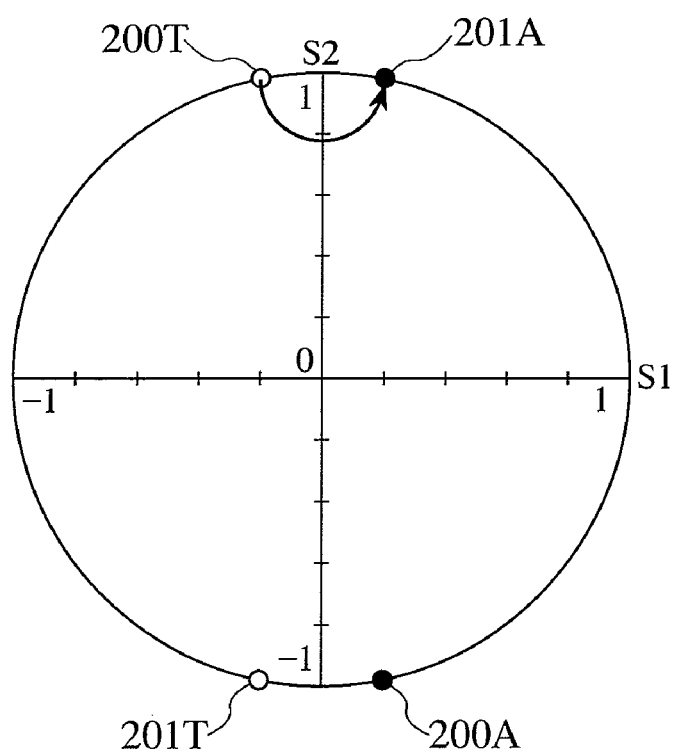

When considered on the Poincare ball, the state of FIG. 9B can be represented as in FIGS. 10A and 10B. FIGS. 10A, 10B apply when the azimuthal angle $\phi = 45°$ and the polar angle $\theta = 60°$, FIG. 10A being a diagram that shows projection onto an S1-S3 surface, and FIG. 10B being a diagram that shows projection onto an S1-S2 surface. A polarization state of the polarized-light transmission axis 11BT at the incident side of the light is denoted as 200T, the linearly polarized light having a polarization component against the absorption axis 11BA, as 200A, the polarized-light transmission axis 12BT at the exit side, as 201T, and the linearly polarized light having a polarization component against the absorption axis 12BA, as 201A. That is to say, a distance 311 between 200T and 201A is equivalent to leakage of light. It can therefore be seen that the leakage light can be prevented by conducting a change 300 from the polarization state of 200T into that of 201A.

While FIGS. 10A, 10B assume an ideal state only of a polarizing layer, a normal type of polarizer has a supporting base material on both sides of a polarizing layer and the supporting base material is usually formed from triacetylcellulose (TAC). Since TAC has a birefringent property, when incident light from an oblique direction exits, the polarized state changes. This change in the polarized state due to the birefringent medium is represented on a Poincare ball by rotating the optical axis of the liquid-crystal layer through a required angle around an axis determined by data (azimuthal angle, viewing angle) relating to incident light. This rotation is based upon the gradient retardation that represents the oblique birefringence determined by physical characteristics data (refractive index, thickness) of the birefringent medium and the data (azimuthal angle, viewing angle) relating to the incident light.

Figure 1:
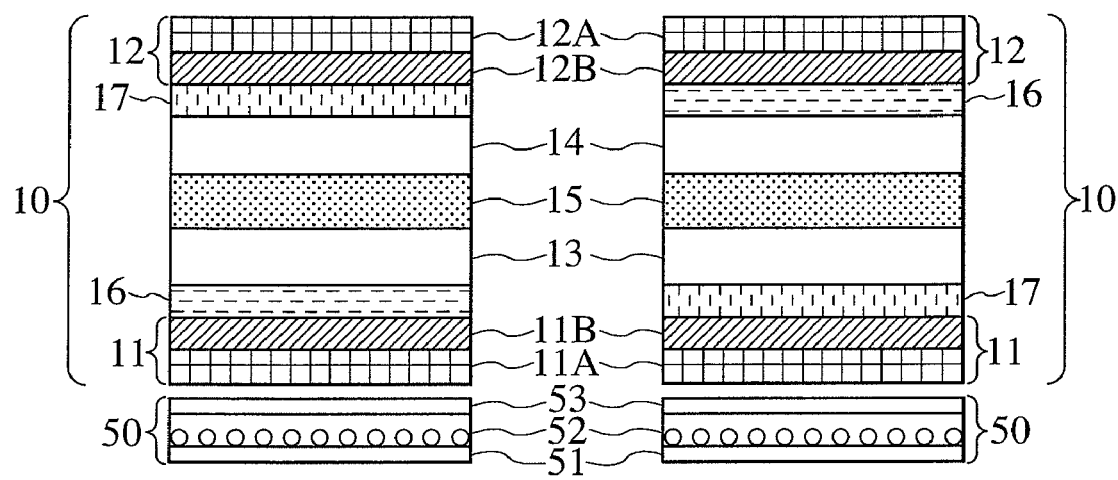
FIG. 1 is a configuration diagram showing an embodiment of a liquid crystal display device of the present invention.
Figure 4:
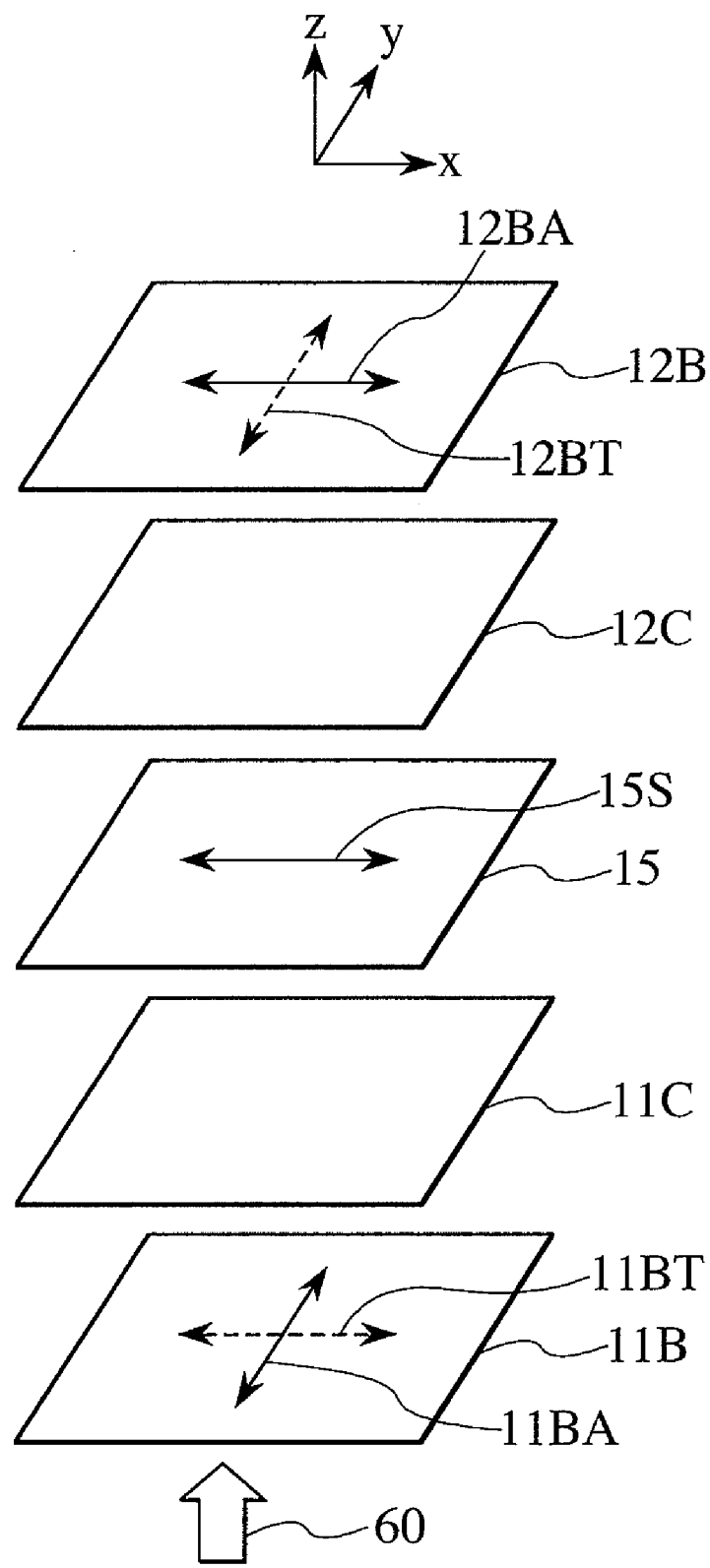
FIG. 4 is a configuration diagram for explaining a liquid crystal display device of the present invention.

For the above reason, although vertical incidence is not affected by the polarization state of the light, oblique incidence is affected by the supporting base material and the oblique incident light changes in polarization state. Changes in polarization states in the optical layer configuration shown in FIG. 4 are next considered. A polarizer is disposed on both sides of a liquid-crystal layer 15, a supporting base material 11C is disposed inside the polarizer 11 at an incident side, and a supporting base material 12C is disposed inside the polarizer 12 at an exit side. An optical axis 15S of the liquid-crystal layer 15 is disposed vertically to an absorption axis 11BA of the incident-side polarizer 11, in parallel to a transmission axis 11BT thereof, in parallel to an absorption axis 12BA of the exit-side polarizer 12, and vertically to a transmission axis 12BT thereof. This scheme is called an e-mode. When the axes of the upper and lower polarizers are rotated through 90°, that is, when the optical axis 15S of the liquid-crystal layer 15 is disposed in parallel to the absorption axis 11BA of the incident-side polarizer 11, vertically to the transmission axis 11BT thereof, vertically to the absorption axis 12BA of the exit-side polarizer 12, and in parallel to the transmission axis 12BT thereof, this scheme is called an o-mode. In addition, usually, supporting base materials 11A and 12A are arranged outside polarizing layers 11B and 12B, respectively, as shown in FIG. 1. In fact, however, the two supporting base materials are omitted since both are unnecessary for considerations on polarization states.

Regarding the configuration shown in FIG. 4, changes in polarization states on a Poincare ball are considered below using FIG. 11A. Hereinafter, unless otherwise defined, considerations are conducted with all physical characteristics data taken as data of the light whose wavelength is 550 nm. Considering the light when viewed at the azimuthal angle φ of 45° and the polar angle θ of 60°, as in FIGS. 10A and 10B, allows one to see that the polarization state of the light which has passed through the transmission axis 11BT of a polarizing layer 11B is denoted by 200T and changed into a polarization state 202 by the supporting base material 11C. Next, the polarization state 202 is changed into a polarization state 203 by the liquid-crystal layer 15, which is indicated at 301. Furthermore, the polarization state 203 is changed into a polarization state 204 by the supporting base material 12C of the exit-side polarizer 12. At this time, 201A denotes the polarization state that matches the absorption axis 12BA of the exit-side polarizing layer 12B, and the light leaks by a distance 310 between the polarization states 204 and 201A.

Figure 11A:
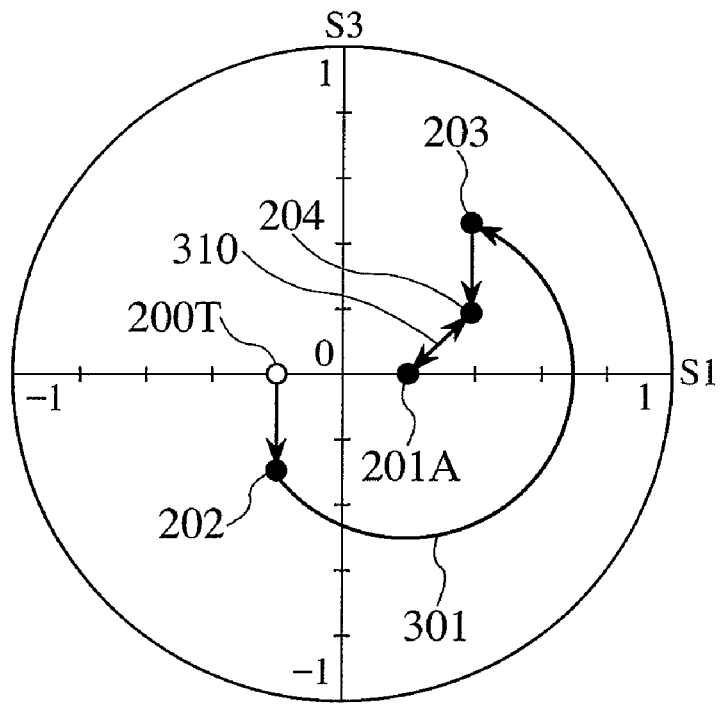
FIGS. 11A and 11B are other Poincare ball representations for explaining a liquid crystal display device of the present invention.
Figure 11B:
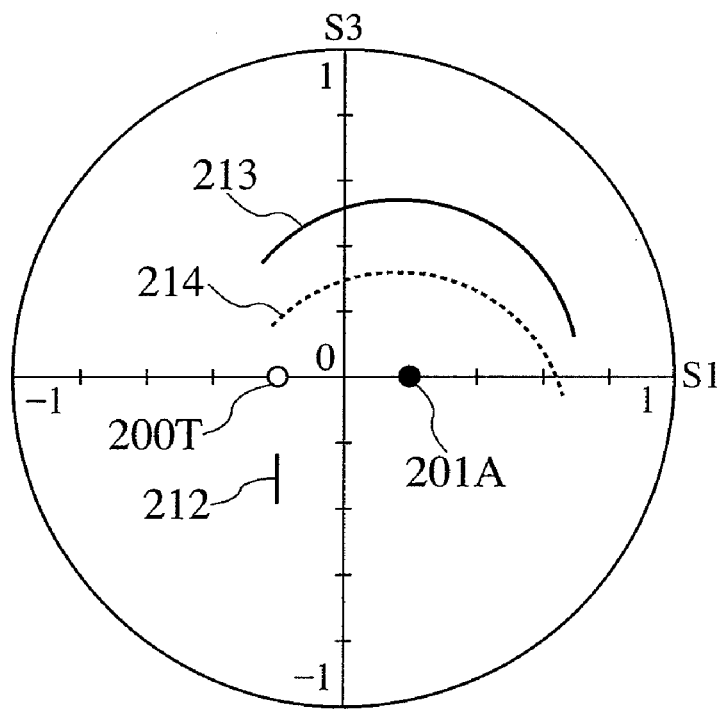

Additionally, although 550-nm light was considered in FIG. 11A, since a visible-light region ranges from 380 to 780 nm, light with a wavelength of 400-700 nm substantially equivalent to the wavelengths of visible light is next considered per FIG. 11B in connection with the configuration of FIG. 4. Considering the light when viewed at the azimuthal angle φ of 45° and the polar angle θ of 60°, as in FIGS. 10A and 10B, allows one to see that the polarization state of the light which has passed through the incident-side polarizing layer 11B is denoted by 200T and changed into a polarization state 212 by the supporting base material 11C. At this time, since a magnitude of retardation differs according to a particular wavelength of the light, length of a line denoting the polarization state 212 indicates that the polarization state is changed into a different one. Furthermore, the polarization state is changed into a polarization state 213 having a wavelength-dependent spread, by the liquid-crystal layer 15. At this time, 201A denotes the polarization state that matches the absorption axis 12BA of the exit-side polarizing layer 12B. Also, the present inventors found that the light leaks by the distance between the polarization states 214 and 201A and that the leakage level of the light differs according to wavelength. It can be understood, however, that the color deteriorates when viewed from oblique directions.

The present invention is described in further detail. A configuration of the liquid crystal display device of the invention is shown in FIG. 1. This liquid crystal display device includes: a first substrate 13 with a first polarizer (incident-side polarizer 11) at an incident side of light; a second substrate 14 with a second polarizing layer (exit-side polarizer 12) at an exit side of the light, a liquid-crystal layer 15 disposed between the first substrate 13 and the second substrate 14 such that respective absorption axes of the polarizing layers on the first and second substrates are substantially vertical to each other (the smaller of two angles formed ranges from 88° to 90°), such that liquid-crystal molecules are substantially parallel to the substrate (the smaller of two angles formed ranges from 0° to 5°), and such that the liquid-crystal layer itself is substantially vertical or substantially parallel to the absorption axis of the first polarizing layer (the smaller of two angles formed ranges from 0° to 2°), and the liquid-crystal layer further being constructed such that when an electric field is applied in a direction parallel to the first substrate, the liquid-crystal molecules rotate in a plane parallel to the first substrate; a matrix-driven electrode group with one pair of electrodes arranged on a pixel-by-pixel basis at a side close to the liquid-crystal layer, on either the first substrate or the second substrate; and a rear-illuminating device.

The left of FIG. 1 shows an e-mode in which an optical axis of the liquid-crystal layer 15 is substantially vertical to the absorption axis of the incident-side polarizing layer 11. In this case, an optical compensating member 16 is held in sandwiched form between the liquid-crystal layer 15 and the incident-side polarizing layer 11 and also functions as a supporting base material, while an optical compensating member 17 is held in sandwiched form between the liquid-crystal layer 15 and the exit-side polarizing layer 12 and also functions as another supporting base material.

Although FIG. 1 includes polarizer supporting base materials 11A, 12A and substrates 13, 14, these can be ignored when polarization states are considered. When these elements are omitted and an optical block diagram that explicitly indicates slow-axis directions of each member in a plane parallel to a substrate is considered, the optical configuration can be as in FIG. 5. A method of using the optical compensating members 16 and 17 to reduce the leakage light from oblique directions in such an optical configuration is next considered.

Figure 12A:
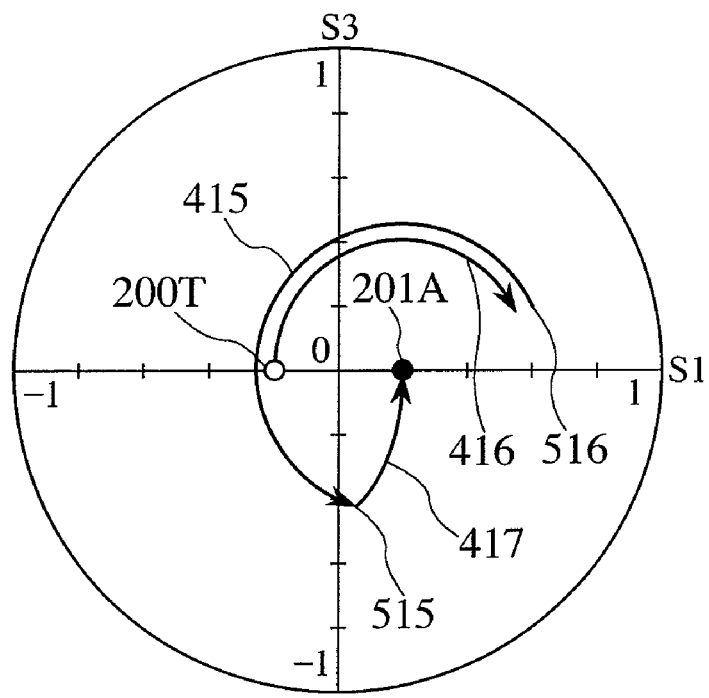
FIGS. 12A and 12B are other Poincare ball representations for explaining a liquid crystal display device of the present invention.
Figure 12B:
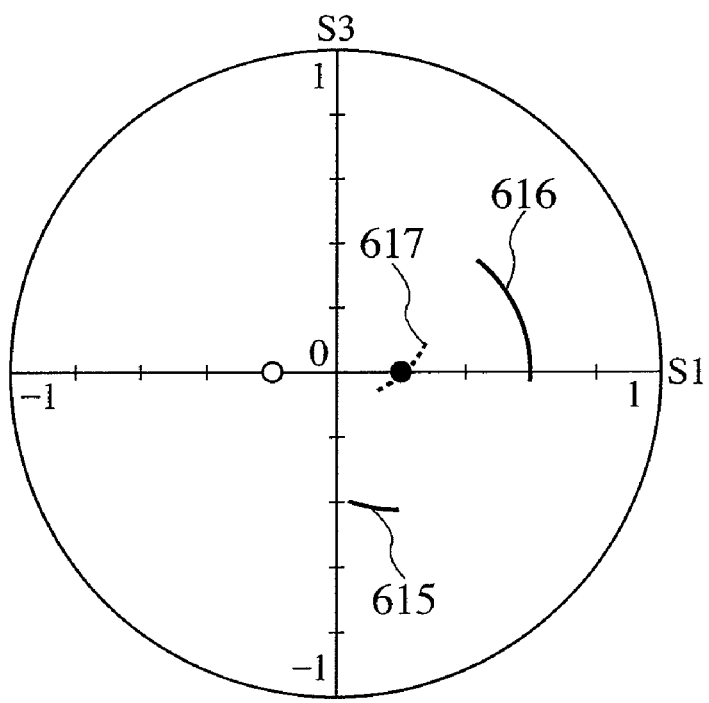

Changes in polarization state are shown in FIGS. 12A and 12B using a Poincare ball. These figures assume that a slow-axis direction in the parallel substrate plane is parallel to an x-axis direction, that x- and y-axial refractive indices are taken as "nx" and "ny", respectively, and that a refractive index in a direction of thickness "dr" is taken as "nz". Also, such a medium that satisfies the following expression is hereinafter called the negative "a-plate":

$$nx \approx nz > ny$$ (Numerical expression 3)

In addition, hereinafter, a retardation of the negative "a-plate" refers to a retardation of the parallel substrate plane.

Considering the light when viewed at the azimuthal angle φ of 45° and the polar angle θ of 60° in FIG. 12A allows one to see that the polarization state of the light which has passed through the transmission axis 11BT of the polarizing layer 11B is denoted by 200T and changed into a polarization state 516 by the optical compensating member 16, which is indicated at 416. Next, the polarization state 516 is changed into a polarization state 515 by the liquid-crystal layer 15 as if a history of the change 416 by the optical compensating member 16 were traced back, which is indicated at 415. Furthermore, the polarization state 515 is changed into the polarization state 201A by the optical compensating member 17, which is indicated at 417.

Additionally, although 550-nm light was considered in FIG. 12A, since the visible-light region ranges from 380 to 780 nm, light with a wavelength of 400-700 nm substantially equivalent to the wavelengths of visible light is next considered per FIG. 12B. Light that has been changed by the optical compensating member 16 has a spread due to the wavelength dispersion of the optical compensating member, as in a polarization state 616. Next, the light is further changed by the liquid-crystal layer 15, but as discussed above, this change follows a change path substantially equal to the above. Thus, when the light that has been assigned a spread by the wavelength dispersion of the optical compensating member is changed into a polarization state 615, the spread comes to be crossed out by a wavelength dispersion of the liquid-crystal layer. A subsequent polarization state change into a polarization state 617 by the optical compensating member 17 makes it possible to dramatically suppress an oblique luminance disturbance and an oblique color disturbance.

The o-mode in the right of FIG. 1 is next considered. In the o-mode, as in the right of FIG. 1, the optical axis of the liquid-crystal layer 15 is substantially parallel to the absorption axis of the incident-side polarizing layer 11. In this case, the optical compensating member 16 is held in sandwiched form between the liquid-crystal layer 15 and the exit-side polarizing layer 12 and also functions as a supporting base material, while the optical compensating member 17 is held in sandwiched form between the liquid-crystal layer 15 and the incident-side polarizing layer 11 and also functions as another supporting base material.

Figure 6:
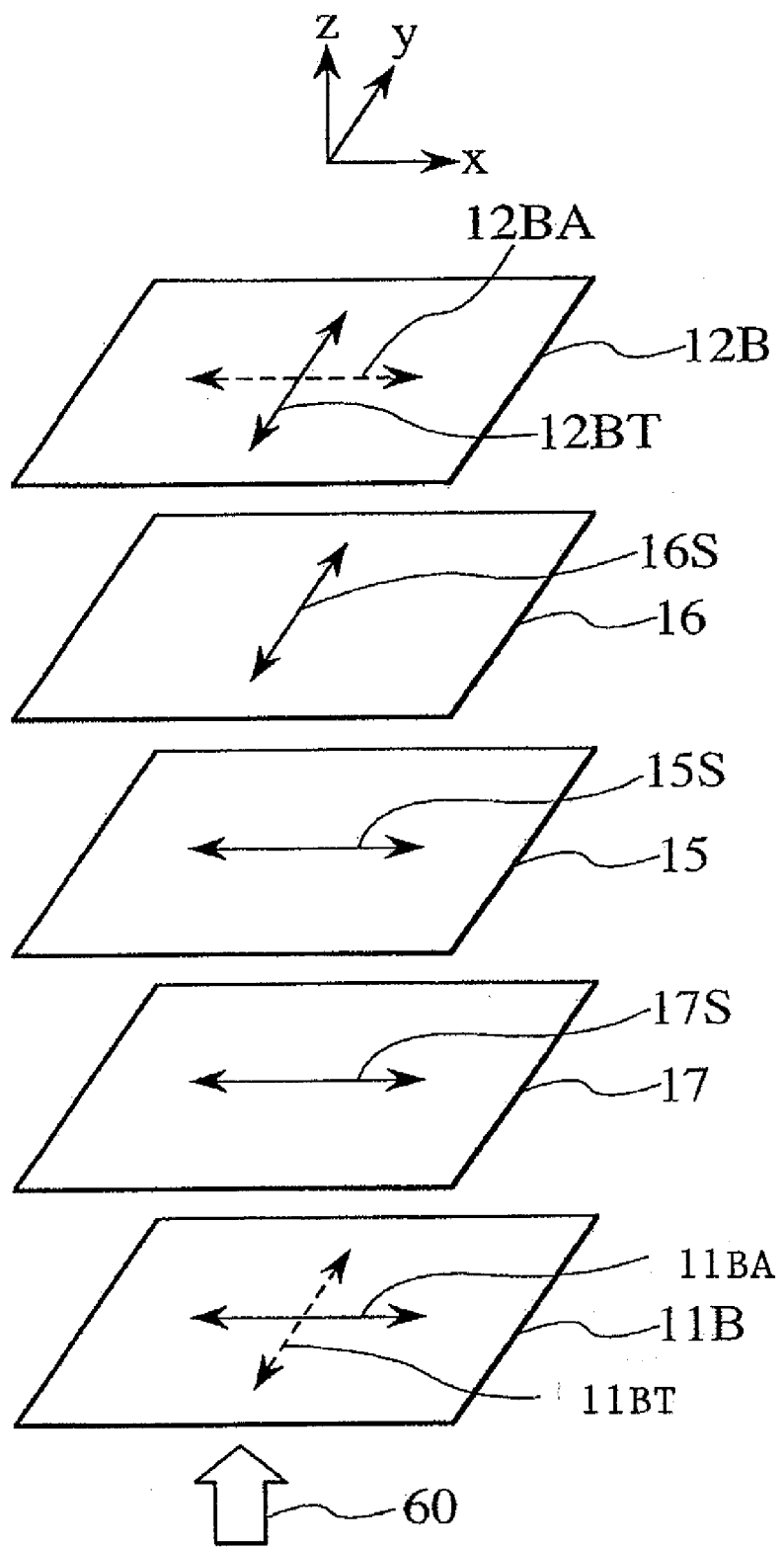
FIG. 6 is a configuration diagram showing a further embodiment of a liquid crystal display device of the present invention.
Figure 13A:
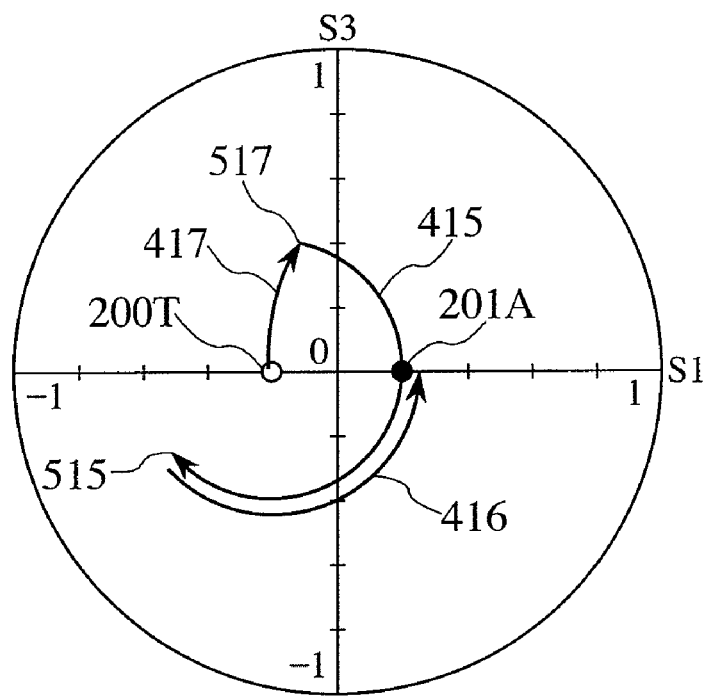
FIGS. 13A and 13B are other Poincare ball representations for explaining a liquid crystal display device of the present invention.
Figure 13B:
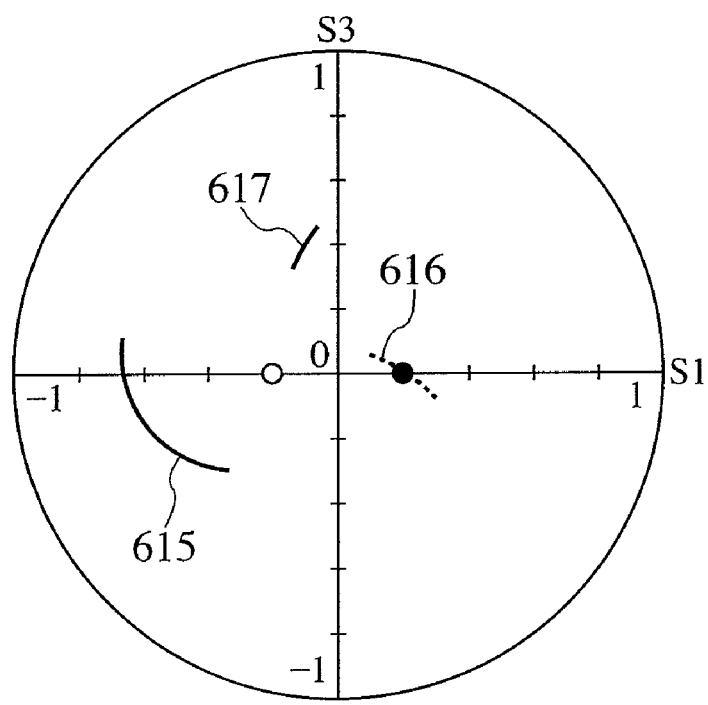

The optical configuration is shown in FIG. 6. Polarization state changes in this case are shown in FIGS. 13A and 13B using a Poincare ball. As shown in FIGS. 13A, 13B, in the o-mode, a polarization state of the light which has passed through the transmission axis 11BT of the polarizing layer 11B is denoted by 200T and undergoes a change 417 to be changed into a polarization state 517 by the optical compensating member 17. Next, the polarization state undergoes a change 415 to be changed into a polarization state 515 by the liquid-crystal layer 15. Next, the polarization state undergoes a change 416 into a point of the polarization state 201A by the optical compensating member 16 as if a history of the change 415 by the liquid-crystal layer 15 were traced back.

The above polarization state change process allows an oblique luminance disturbance and an oblique color disturbance to be suppressed. According to these studies, under an appropriate configuration, the viewing-angle characteristics during black display become substantially equal between the o-mode and the e-mode.

As would be understandable from the discussion conducted so far herein, according to the present invention, even if the retardation of the liquid-crystal layer 15 and that of the optical compensating member 16 are positive wavelength dispersion levels, an advantageous effect that counteracts both wavelength dispersion levels can be obtained, which improves viewing performance over that achievable using any of the conventional techniques.

This concept is further advanced. If the wavelength is expressed as $\lambda$, the azimuthal angle as $\phi$, and the polar angle as $\theta$, an optical design that satisfies the following expression becomes optimal to obtain an ideal result:

$$\Delta nLC(\lambda,\phi,\theta)dLC(\theta)-\Delta n(\lambda,\phi,\theta)d(\theta)=k\lambda$$

$$(\Delta n=nx-ny)$$

(k: Constant)  (Numerical Expression 4)

where $\Delta nLC(\lambda, \phi, \theta)$ denotes a difference between a refractive index of extraordinary light and that of ordinary light, $dLC(\theta)$ denotes optical-path length of the liquid-crystal layer 15, $\Delta n(\lambda, \phi, \theta)$ denotes a difference between refractive indices nx, ny in the parallel substrate plane of the optical compensating member 16, and $d(\theta)$ denotes optical-path length of the optical compensating member 16. In this method, selection of materials for the liquid crystal and the optical compensating member 16 becomes very important. In general, however, an optimum balance between the optical constant and wavelength dispersion of the optical compensating member 16 is difficult to achieve by materials selection.

The following examples can be presented as methods close to the above design guidelines. In Patent Document 7, the influence of the liquid-crystal layer which causes the largest wavelength dispersion of the refractive index in the optical configuration is eliminated, whereas the influence of the optical compensating members remains unremoved.

It is known that as in Non-Patent Document 2, the wavelength dispersion of a refractive index can well be approximated using the empirical formula called the Shellmeier's dispersion formula. A further approximated version of the Shellmeier's dispersion formula is the Cauthy's dispersion formula represented as follows:

$$n=A+B/\lambda^2+C/\lambda^4$$  (Numerical expression 5)

where A, B, and C are constants.

The wavelength dispersion of $\Delta n$ of a polycarbonate (PC), a material for a general-purpose optical compensating member, is roughly represented as follows:

$$\Delta n=0.9+0.04/\lambda^2+0.0008/\lambda^4$$  (Numerical Expression 6)

The wavelength dispersion of $\Delta n$ of this general-purpose optical compensating member makes differences in polarization state change according to wavelength, hence causing changes in chromaticity. In contrast to this, the liquid-crystal layer 15 and optical compensating member 16 studied herein take an optical configuration that counteracts the above wavelength dispersion of the refractive index. Compared with such optical configuration influenced by the wavelength dispersion of the optical compensating member as in Patent Document 7, therefore, the optical configuration in the present invention makes chromaticity changes significantly suppressible.

Figure 14A:
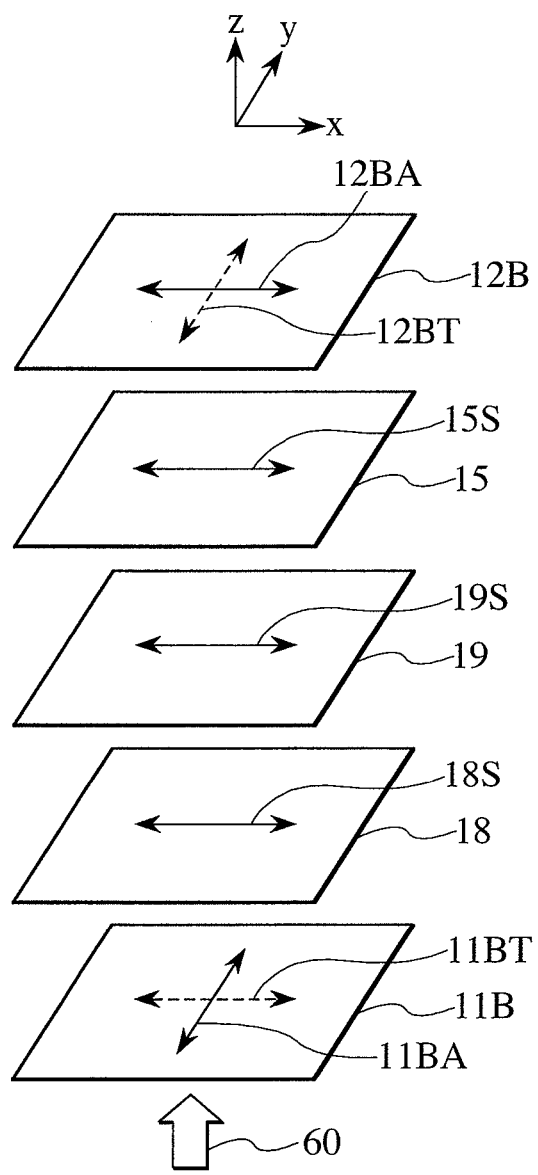
FIG. 14A is a configuration diagram of a liquid crystal display device according to the present invention.
Figure 14B:
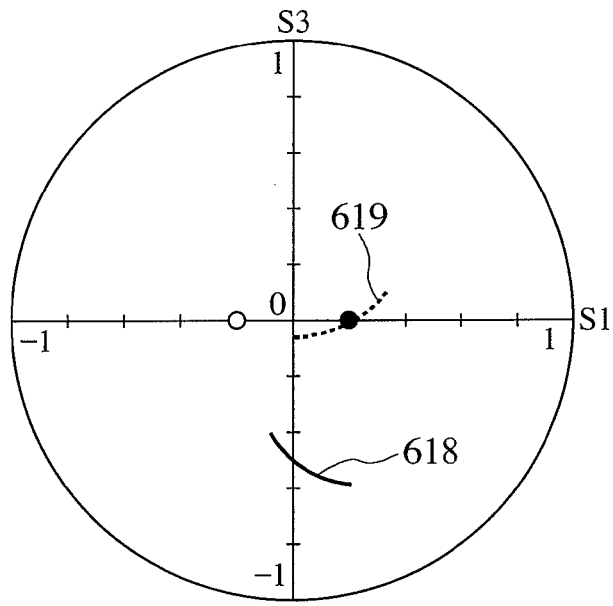
FIG. 14B is a Poincare ball representation for explaining the liquid crystal display device of FIG. 14A.

The optical configuration of an e-mode, proposed as an example in Patent Document 7, is shown in FIG. 14A, and polarization state changes of the light having a wavelength of 400-700 nm substantially equivalent to a visible-light region is shown in FIG. 14B. In the optical configuration of Patent Document 7, the influence of the liquid-crystal layer 15 is almost removable by using the optical compensating members 18 and 19, whereas the influence of the optical compensating members 18 and 19 remains unremoved. When the polarization state of the light is changed by the optical compensating members 18, 19, the wavelength dispersion thereof assigns a spread to the polarization state, as in 618, 619, resulting in an oblique luminance disturbance and changes in chromaticity. In contrast to this, in the optical configuration studied herein, differences in polarization state change at wavelengths of R, G, and B, are suppressed, as in FIG. 12B. A liquid crystal display device substantially free from an oblique luminance disturbance and a chromaticity change is thus realized.

For example, if, in a general liquid crystal display device with a red/green/blue tri-color filter, transmission peak wavelengths of the red, green, and blue regions of the color filter are taken as R, G, and B, respectively, thickness of a liquid-crystal layer 15 as dLCR, dLCG, dLCB, and thickness of an optical compensating member 16 as drR, drG, drB, a material of the optical compensating member is selected so that the following condition is satisfied:

$$|\Delta nLC(B)\cdot dLCB-(n1(B)-n2(B))\cdot drB|/|\Delta nLC(G)\cdot dLCG-(n1(G)-n2(G))\cdot drG|<(0.9+0.04/B^2+0.0008/B^4)/(0.9+0.04/G^2+0.0008/G^4)|\Delta nLC(G)\cdot dLCG-(n1(G)-n2(G))\cdot drG|/|\Delta nLC(R)\cdot dLCR-(n1(R)-n2(R))\cdot drR|<(0.9+0.04/G^2+0.0008/G^4)/(0.9+0.04/R^2+0.0008/R^4)$$  (Numerical expression 7)

This condition becomes particularly important for providing a wider range of choices for the material of the optical compensating member. When an optical compensating member of a general material is used, merely employing the optical configuration studied herein makes it possible to satisfy the condition defined by expression (7), and obtain optical characteristics equivalent to or surpassing those described in Patent Document 7. However, desired optical characteristics may not be obtainable if a material with wavelength dispersion characteristics significantly different from those of a general material is used for wider selection of the materials usable as alternatives. In that case, it is possible to satisfy expression (7) by undertaking the countermeasures described later herein.

For example, advantageous effects close to those of the above-described optical design can be developed by adjusting the retardation of the optical compensating member 16 independently for each color region of the color filter. If this method is adopted, optical designing close to that which satisfies expression (4) can be implemented using a condition other than selecting a material.

Alternatively, advantageous effects close to those of the above-described optical design can likewise be developed by changing the thickness of the liquid-crystal layer 15, that is, a cell gap, for each color region of the color filter. For example, in a general liquid crystal display device with a red/green/blue tri-color filter, if thicknesses of a liquid-crystal layer 15 that are associated with the color filter components of red, green, and blue, are taken as dR, dG, and dB, respectively, the liquid-crystal layer 15 is so-called "multi-gapped" to satisfy the following condition:

$$dR \geq dG > dB \qquad \text{(Numerical expression 8)}$$

If this method is adopted, an optical design creating a state close to such an ideal state that satisfies expression (4) can be achieved using a condition other than defining optical constants.

Further detailed examples of the concepts discussed above are shown in the embodiments below.

EMBODIMENTS

Content of the present invention is described in further detail below by showing more specific examples of the invention. The embodiments below represent specific examples of the present invention and do not limit the invention. Study results derived from numeric calculations obtained using optical simulation based on the 4×4-matrix method disclosed in Non-Patent Document 3 are included in the embodiments. The simulation assumes a general configuration and is based on spectral characteristics of a tri-wavelength cathode-ray tube used in a normal type of backlight, spectral transmission characteristics of a red/green/blue tri-color filter, and polarizing layer spectral characteristics of the 1224DU polarizer manufactured by the Nitto Denko Corp. The above simulation also assumes a nematic liquid crystal having a liquid-crystal layer, which contains liquid-crystal molecules whose extraordinary-light refractive index is 1.573 and whose ordinary-light refractive index is 1.484, and the liquid-crystal layer is 3.9 μm thick. In addition, a polycarbonate(PC)-based, polystyrene-based, or norbornene-based material, or the like, or a liquid-crystalline high-molecular polymeric material is used for wavelength dispersion of optical compensating members, but the invention is not limited to or by these materials.

The present invention also assumes disposing an optical compensating member between a first substrate and a second substrate, and this technique is disclosed in, for example, Patent Document 8 and others. According to the present inventors' studies, one of problems associated with such a technique exists in surface planarity. When an optical compensating member is disposed between the first substrate and the second substrate, if the optical compensating member has a rough surface, this causes nonuniform liquid-crystal layer thickness, thus resulting in nonuniform in-plane display or in reduced contrast. According to the present inventors' studies, however, in the IPS mode using such an electric fringe field as proposed in Patent Document 9, the nonuniformity of in-plane display or reduction in contrast due to the nonuniformity of the liquid-crystal layer in thickness does not easily occur, so the IPS mode with the above-mentioned fringe field can be easily combined with the technique of disposing an optical compensating member between the first substrate and the second substrate.

Figure 2:
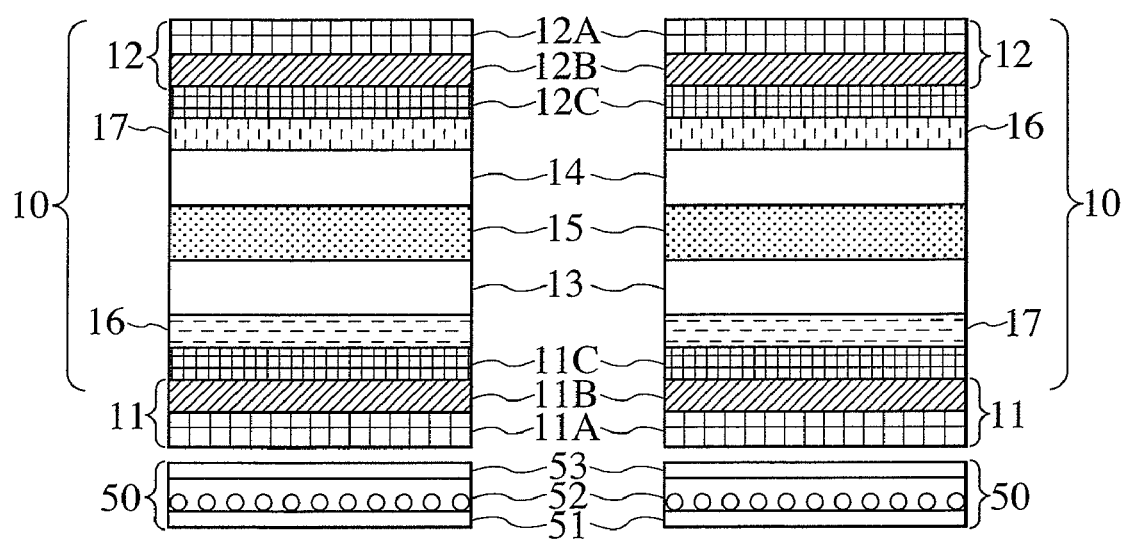
FIG. 2 is a configuration diagram showing another embodiment of a liquid crystal display device of the present invention.
Figure 3:
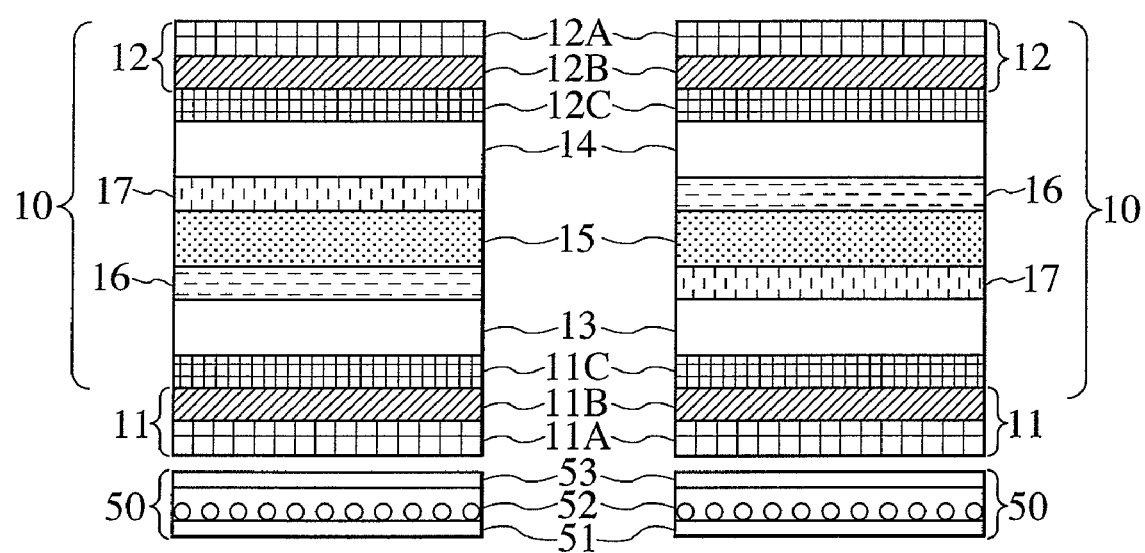
FIG. 3 is a configuration diagram showing yet another embodiment of a liquid crystal display device of the present invention.

Additionally, since a current general configuration is described in the embodiments, the description assumes that one birefringent function is realized for one optical compensating member, but birefringence of each optical compensating member shown in the embodiments may be realized by combining a plurality of optical compensating members. For example, retardation may be adjusted by stacking optical compensating members. Alternatively, each optical compensating member and each polarizing layer may be formed by coating the surface of the substrate with a material and then conducting an aligning process. In this case, however, the configuration shown in the particular embodiment may change. More specifically, the particular polarizing layer may be disposed at the liquid-crystal layer side of the substrate. Furthermore, while FIG. 1 is shown as a structural example in the embodiments, there is no problem, even if the structure shown in FIG. 2 or 3 is employed. The present invention places importance upon the optical configuration, and provided that the optical configuration shown in the invention is realized, advantageous effects thereof can be attained, irrespective of a physical configuration. For this reason, the optical configuration is shown in the embodiments where appropriate.

The terms "vertical" and "90°" used in the embodiments do not mean a completely vertical state, and re-reading these expressions to mean a substantially vertical state or to mean that the smaller of two angles formed between associated optical elements ranges from 88° to 90° does not affect the essence of the description. This also applies to other terms such as "parallel".

The liquid-crystal cells, electrode structures, substrates, polarizer layers, and illumination device used in a conventional device of the IPS mode can be applied as they are. The present invention relates to specifications and configurations of optical members.

The smaller of two angles of the liquid-crystal layer optical axis with respect to the substrate under an electrically de-energized state of the liquid-crystal layer, that is, a pre-tilt angle is 0° in the simulation shown in the embodiments, but in a range of ±5°, there is no significant difference between tendencies shown in the embodiments. However, the most favorable characteristics of all those actually obtained are exhibited at the pre-tilt angle of 0°.

The terms used herein are next described. Optical compensating members can be considered as refractive index ellipsoids, and if the refractive indices in the parallel substrate plane are defined as "nx", "ny", a refractive index having an axis in a direction vertical to the medium, as "nz", and thickness of each optical compensating member, as "dr", then the retardation Δnd in the parallel substrate plane that denotes birefringence, retardation Rth in the thickness direction, and an Nz coefficient are expressed as follows:

$$\Delta nd = |(nx-ny)d|$$

$$Rth = |((nx+ny)/2-nz)d|$$

$$Nz = (nx-nz)/(ny-nz) \qquad \text{(Numerical expression 9)}$$

Hereinafter, unless otherwise defined for 0<Nz<1 in a biaxially anisotropic optical compensating member, the retardation refers to the retardation in the parallel substrate plane. In addition, unless otherwise defined for Nz<0, 1<Nz, the retardation refers to the retardation Rth in the thickness direction.

Furthermore, a "substantially isotropic property" refers to that of a medium whose in-plane retardation and thickness-directional retardation are greater than 0 nm, but smaller than 20 nm. Other media are birefringent media.

The kinds of birefringent media other than biaxially anisotropic optical compensating members include uniaxially anisotropic optical compensating members. In the embodiments, a positive "a-plate", a negative "a-plate", a positive "c-plate", and a negative "c-plate" are used, which are described below.
Positive "a-plate": nx>ny≠nz
Negative "a-plate": nx≈nz>ny
Positive "c-plate": nz>nx≈ny
Negative "c-plate": nx≈ny>nz
Hereinafter, unless otherwise defined, a retardation of the "a-plate" refers to the retardation in the parallel substrate plane, and a retardation of the "c-plate" refers to the retardation in the thickness direction.

Moreover, although these uniaxially anisotropic optical compensating members are used in the embodiments, it is not always necessary, according to the present inventors' studies, to use the positive "a-plate", the negative "a-plate", the positive "c-plate", or the negative "c-plate". Therefore, there is no problem, even if the negative "a-plate" is considered to satisfy −0.3<Nz<0.3, the positive "a-plate" to satisfy 0.7<Nz<1.0, the positive "c-plate" to satisfy Nz<−5, or the negative "c-plate" to satisfy Nz>5.

First Embodiment

Figure 5:
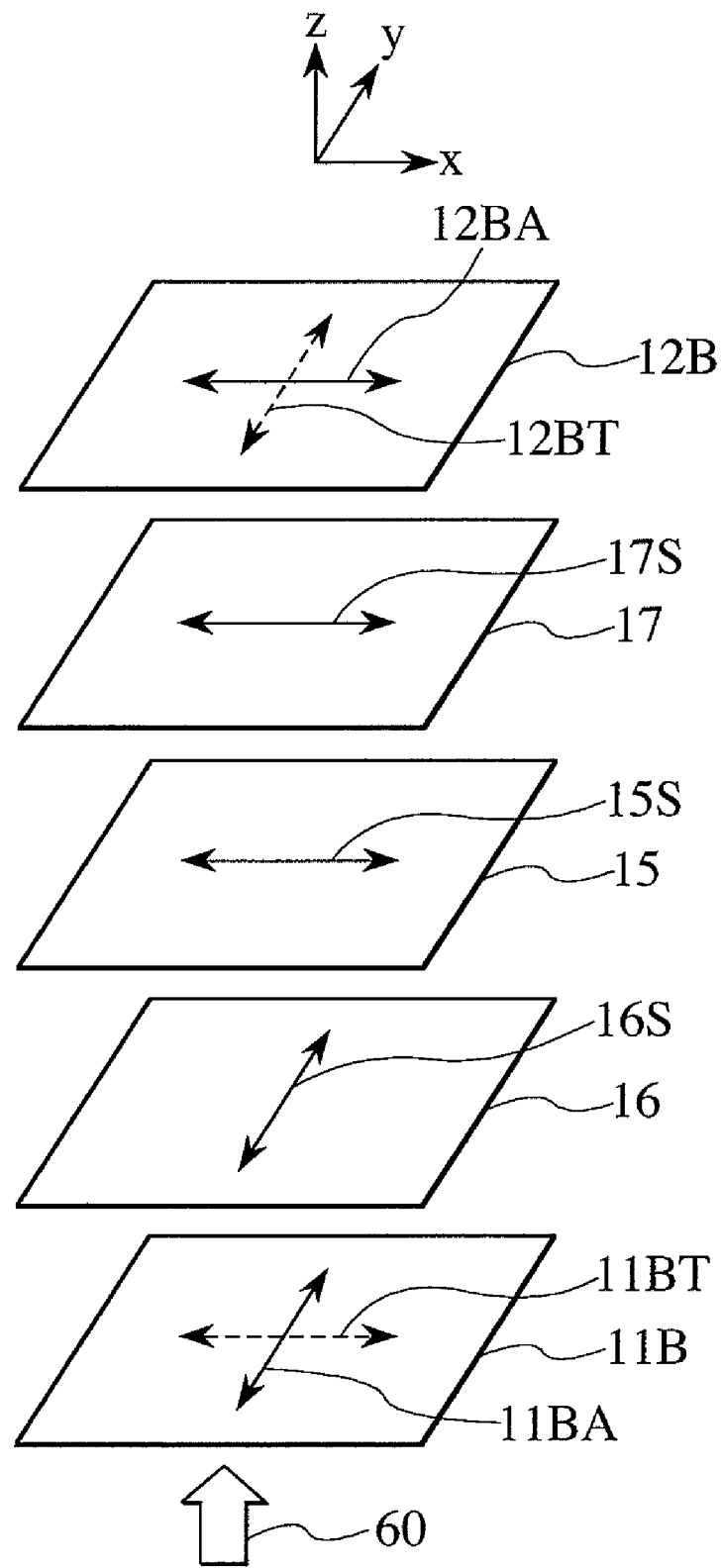
FIG. 5 is a configuration diagram showing still another embodiment of a liquid crystal display device of the present invention.

A structure of a first embodiment is shown in the left of FIG. 1, and an optical configuration of the e-mode, in FIG. 5. In the present embodiment, a negative "a-plate" is used as an optical compensating member 16, and a biaxially anisotropic optical compensating member with an Nz coefficient smaller than 0 is used as an optical compensating member 17. This configuration makes it possible to achieve the polarization state changes shown in FIGS. 12A and 12B. A polarization state of light which has passed through a transmission axis 11BT of a polarizing layer 11B is denoted by 200T and undergoes a change 416 to be changed into a polarization state 516 by the optical compensating member 16. Next, the polarization state undergoes a change 415 to be changed into a polarization state 515 by a liquid-crystal layer 15 as if a history of the change 416 by the optical compensating member 16 were traced back. The polarization state further undergoes a change 417 into a polarization state 201A by the optical compensating member 17.

There is a need to define evaluation indices here. The present invention is intended to reduce changes in luminance and color, associated with changing a viewing angle during black display, so respective evaluation indices need to be introduced.

A maximum transmittance value achievable when the viewing angle is changed is introduced as an index of changes in luminance. The transmittance here means that calculated with visible sensitivity at an incident-light wavelength of 400-700 nm taken into account. This is next described per FIG. 15. This figure shows evaluation results on transmittance-viewing angle characteristics obtained at a fixed azimuthal angle and different polar angles during black display in three kinds of liquid crystal display devices different in specifications of the optical compensating members. It can be seen from FIG. 15 that specifications 3 provide the most favorable luminance change characteristics. In addition, comparisons between the maximum transmittance values in the three kinds of specifications indicate that similar results are obtained. Reference numerals 451T1, 451T2, and 451T3 denote the maximum transmittance values of specifications 1, specifications 2, and specifications 3, respectively. As can be seen from these results, as the maximum transmittance value decreases, changes in luminance due to changes in viewing angle also decrease. When such an optical compensating member as shown in FIG. 9 is not provided, the maximum transmittance value during black display is about 2%.

Figure 16:
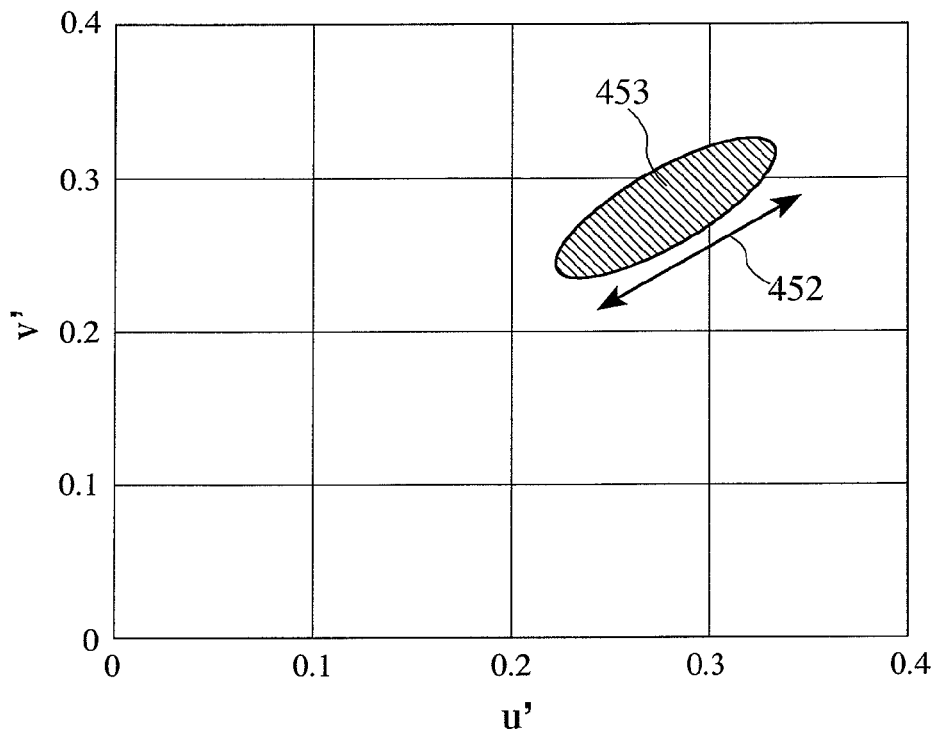
FIG. 16 is another conceptual diagram shown to explain evaluation indices used in the present invention.

Next, Δu'v' is introduced as an index of changes in chromaticity. An explanatory diagram is shown in FIG. 16. FIG. 16 is a u' v' chromaticity-plotted representation of the colors developed during black display in the configuration of FIG. 9, and all chromaticity coordinates associated with all azimuthal angles and all polar angles are plotted in the figure. The elliptic region shown in FIG. 16 is consequently obtained. Reducing changes in chromaticity due to changes in the viewing angle is equivalent to downsizing the elliptic region of FIG. 16. Major-axis length of the ellipse is therefore adopted as an evaluation index, and Δu'v' is the index.

Figure 17:
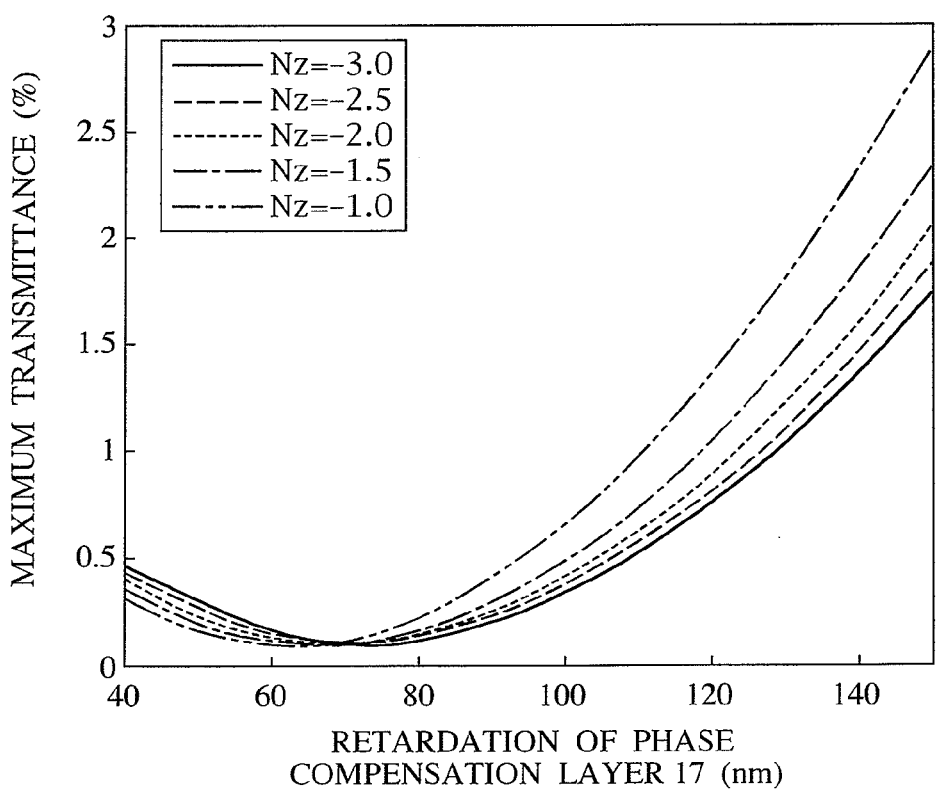
FIG. 17 is a characteristics diagram showing an embodiment of a liquid crystal display device of the present invention.
Figure 18:
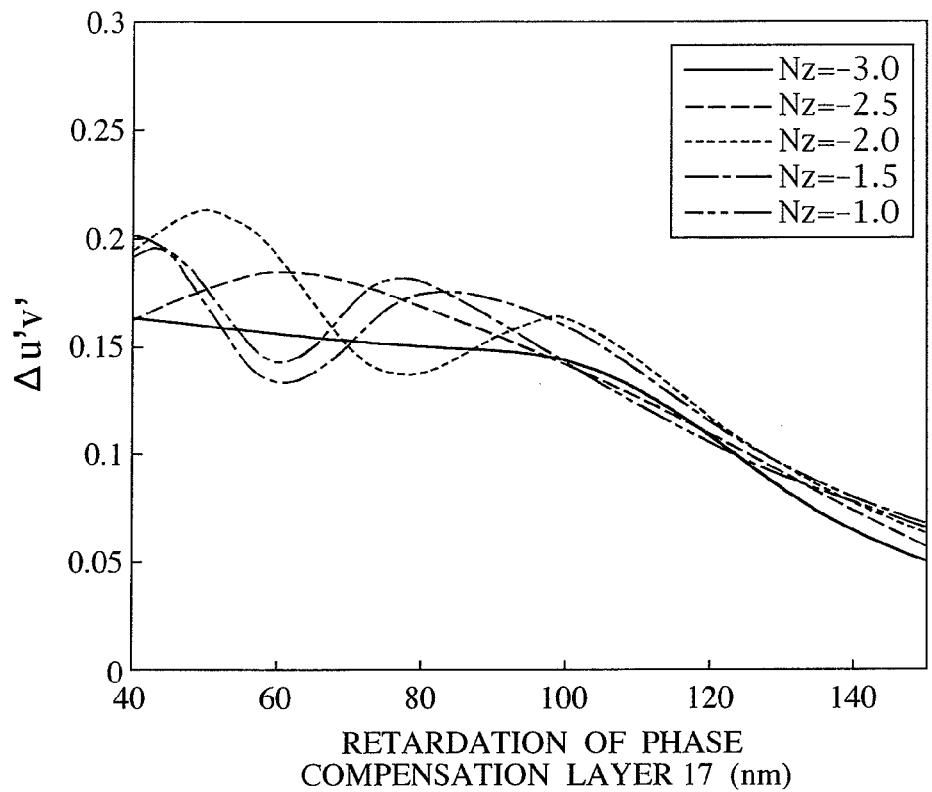
FIG. 18 is a characteristics diagram showing another embodiment of a liquid crystal display device of the present invention.

In contrast to this, maximum transmittances attained in the present embodiment by changing the Nz coefficient and retardation value of the optical compensating member 17 in a range from −3 to −1 and a range from 40 to 150 nm, respectively, with the retardation value of the optical compensating member 16 fixed at 240 nm, are shown in FIG. 17, and Δu'v', in FIG. 18. A maximum transmittance of 2% or below is obtained in a retardation range of 40-130 nm, and favorable viewing-angle characteristics are realized. In addition, when the Nz coefficient and retardation value of the optical compensating member 17 are −1.0 and 60 nm, respectively, a maximum transmittance of 0.089% and a Δu'v' value of 0.14 are attained and particularly favorable results obtained. This Δu'v' value is therefore applied in the present embodiment.

Furthermore, as discussed above, using the multi-gapping technique to independently change each of the liquid-crystal layer thicknesses dR, dG, and dB associated with the color filter components of R (red), G (green), and B (blue), makes it possible to further reduce oblique luminance changes and chromaticity changes, for example, if dR≧dG>dB.

Positionally inverse arrangement of the liquid-crystal layer 15 and optical compensating member 16 in the optical configuration also yields substantially the same results as those obtained in the e-mode.

Second Embodiment

A structure of a second embodiment is shown in the right of FIG. 1, and an optical configuration of the o-mode, in FIG. 6. In the present embodiment, a negative "a-plate" is used as an optical compensating member 16, and a biaxially anisotropic optical compensating member with an Nz coefficient smaller than 0 is used as an optical compensating member 17. This configuration makes it possible to achieve the polarization state changes shown in FIGS. 13A and 13B. A polarization state of light which has passed through a transmission axis 11BT of a polarizing layer 11B is denoted by 200T and undergoes a change 417 to be changed into a polarization state 517 by the optical compensating member 17. Next, the polarization state undergoes a change 415 to be changed into a polarization state 515 by a liquid-crystal layer 15. The polarization state further undergoes a change 416 into a point of a polarization state 201A by the optical compensating member 16 as if a history of the change 415 by the liquid-crystal layer 15 were traced back. In the present embodiment, a maximum transmittance of 2% or below in the retardation range of 40-130 nm is attained and substantially the same results as obtained in the e-mode of the first embodiment are obtained.

An optimum retardation value of the optical compensating member 16 and an optimum retardation value and optimum Nz coefficient of the optical compensating member 17 depend upon the retardation value of the liquid-crystal layer and upon wavelength dispersion characteristics of these optical members. Positionally inverse arrangement of the liquid-crystal layer 15 and optical compensating member 16 in the optical configuration also yields substantially the same results as those obtained in the e-mode of the first embodiment.

Third Embodiment

A structure of a third embodiment is shown in the left of FIG. 1, and an optical configuration of the e-mode, in FIG. 5. In the present embodiment, a negative "a-plate" is used as an optical compensating member 16, and a biaxially anisotropic optical phase-compensating film with an Nz coefficient greater than 0, but smaller than 1, is used as an optical compensating member 17. This configuration also makes it possible to achieve the polarization state changes shown in FIGS. 12A and 12B. A polarization state of light which has passed through a transmission axis 11BT of a polarizing layer 11B is denoted by 200T and undergoes a change 416 to be changed into a polarization state 516 by the optical compensating member 16. Next, the polarization state undergoes a change 415 to be changed into a polarization state 515 by a liquid-crystal layer 15 as if a history of the change 416 by the optical compensating member 16 were traced back. The polarization state further undergoes a change 417 into a polarization state 201A by the optical compensating member 17.

Figure 19:
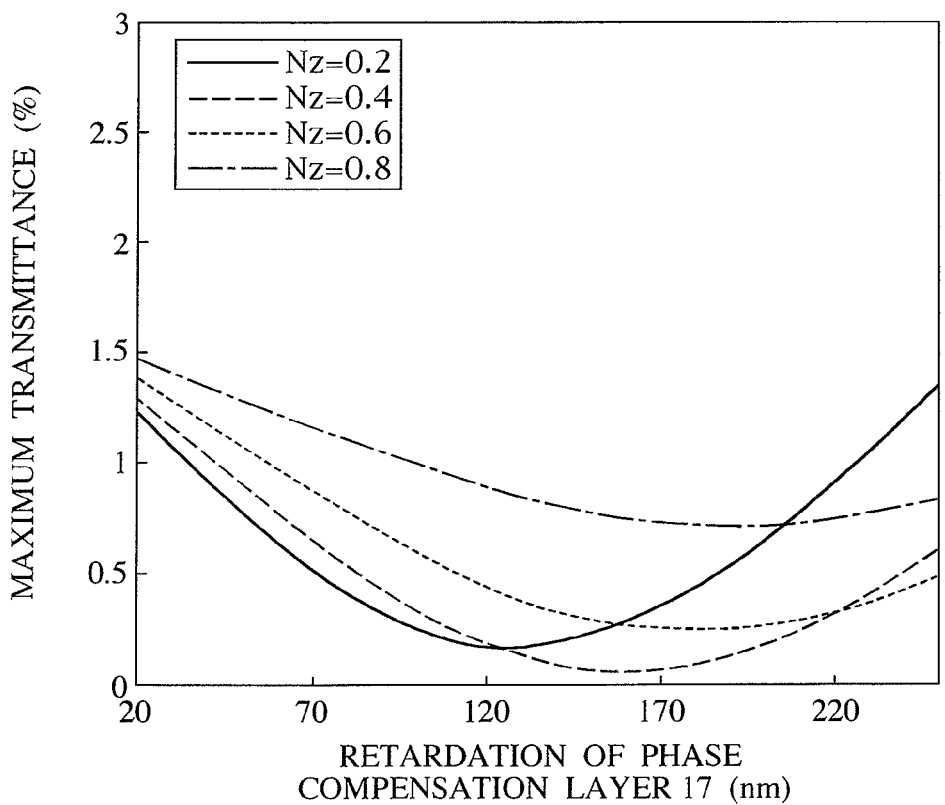
FIG. 19 is a characteristics diagram showing yet another embodiment of a liquid crystal display device of the present invention.
Figure 20:
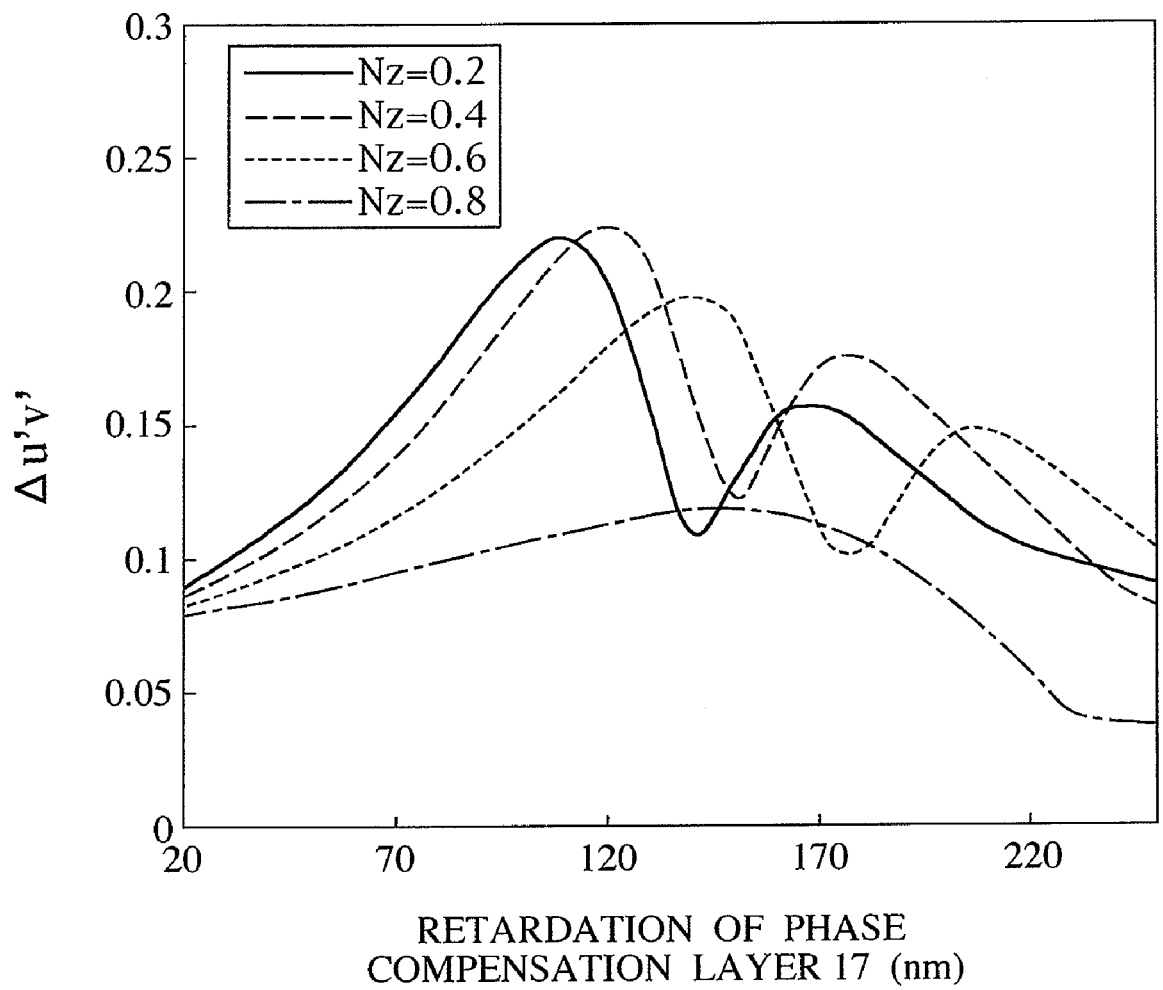
FIG. 20 is a characteristics diagram showing still another embodiment of a liquid crystal display device of the present invention.

Maximum transmittances attained in the present embodiment by changing the Nz coefficient and retardation value of the optical compensating member 17 in a range from 0.2 to 0.8 and a range from 20 to 250 nm, respectively, with the retardation value of the optical compensating member 16 fixed at 300 nm, are shown in FIG. 19, and Δu'v', in FIG. 20. A maximum transmittance of 2% or below is obtained in a retardation range of 20-230 nm, and favorable viewing-angle characteristics are realized. In addition, when the Nz coefficient and retardation value of the optical compensating member 17 are 0.4 and 150 nm, respectively, a maximum transmittance of 0.075% and a Δu'v' value of 0.12 are attained and particularly favorable results obtained. This Δu'v' value is therefore adopted in the present embodiment.

As can be seen from the polarization state changes in FIGS. 12A, 12B and from the results in FIGS. 19, 20, an optimum retardation value of the optical compensating member 16 and an optimum Nz coefficient and optimum retardation value of the optical compensating member 17 depend upon the retardation value of the liquid-crystal layer and upon wavelength dispersion characteristics of these optical members. In addition, the results in the o-mode and the results obtained by positionally inverse arrangement of the liquid-crystal layer 15 and optical compensating member 16 in the optical configuration are substantially the same as obtained in the e-mode.

Fourth Embodiment

Figure 21:
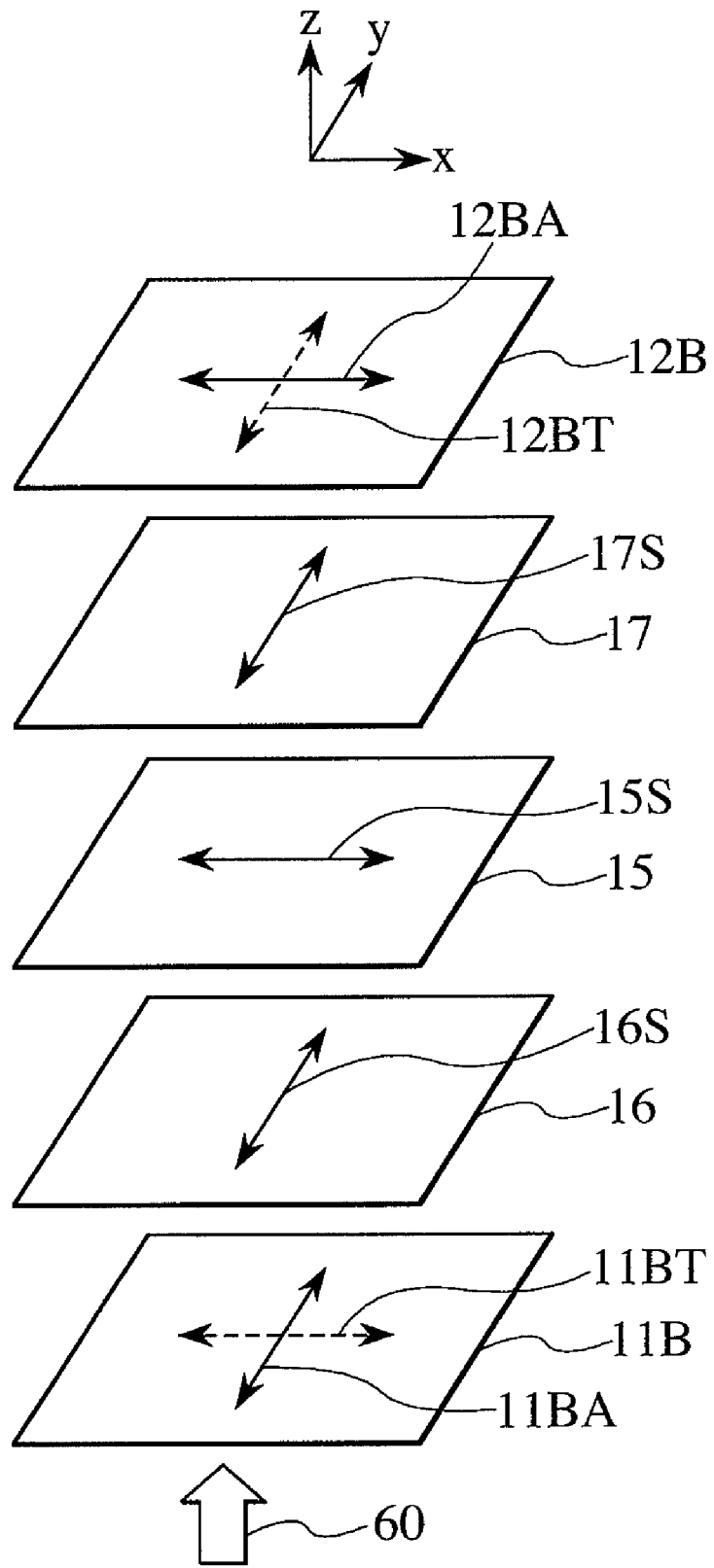
FIG. 21 is a configuration diagram showing a further embodiment of a liquid crystal display device of the present invention.

A structure of a fourth embodiment is shown in the left of FIG. 1, and an optical configuration of the e-mode, in FIG. 21. In the present embodiment, a negative "a-plate" is used as an optical compensating member 16, and a biaxially anisotropic optical compensating member with an Nz coefficient smaller than 0 is used as an optical compensating member 17. This configuration makes it possible to achieve the polarization state changes shown in FIG. 22. A polarization state of light which has passed through a transmission axis 11BT of a polarizing layer 11B is denoted by 200T and undergoes a change 416 to be changed into a polarization state 516 by the optical compensating member 16. Next, the polarization state undergoes a change 415 to be changed into a polarization state 515 by a liquid-crystal layer 15 as if a history of the change 416 by the optical compensating member 16 were traced back. The polarization state further undergoes a change 417 into a polarization state 201A by the optical compensating member 17.

Figure 23:
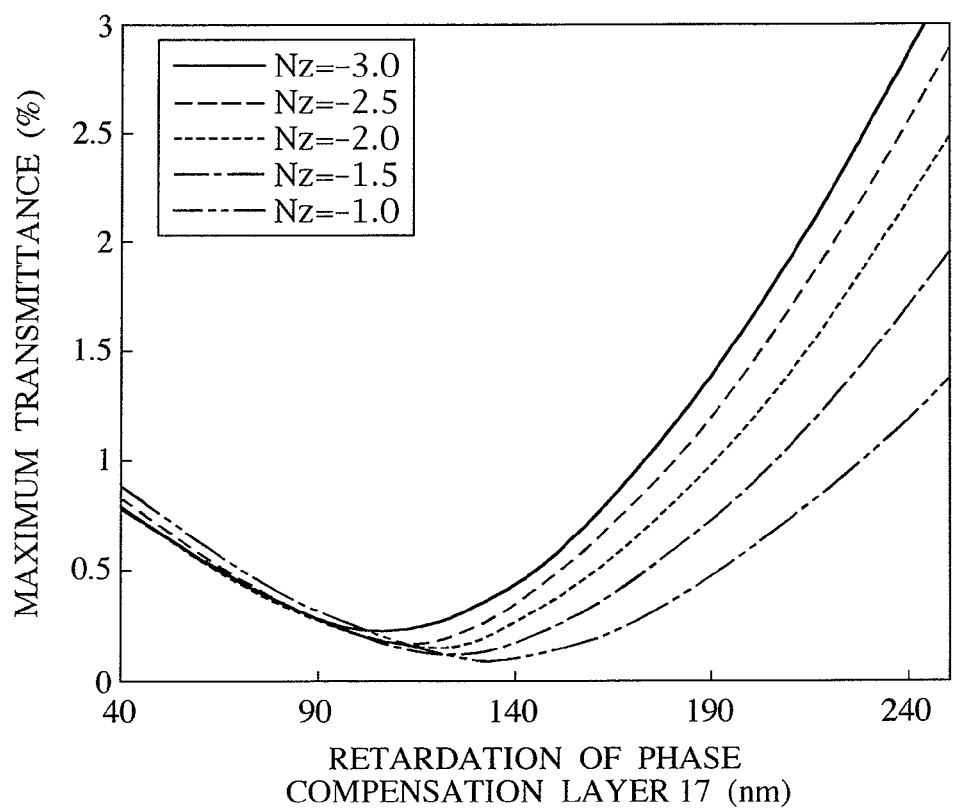
FIG. 23 is a characteristics diagram showing a further embodiment of a liquid crystal display device of the present invention.
Figure 24:
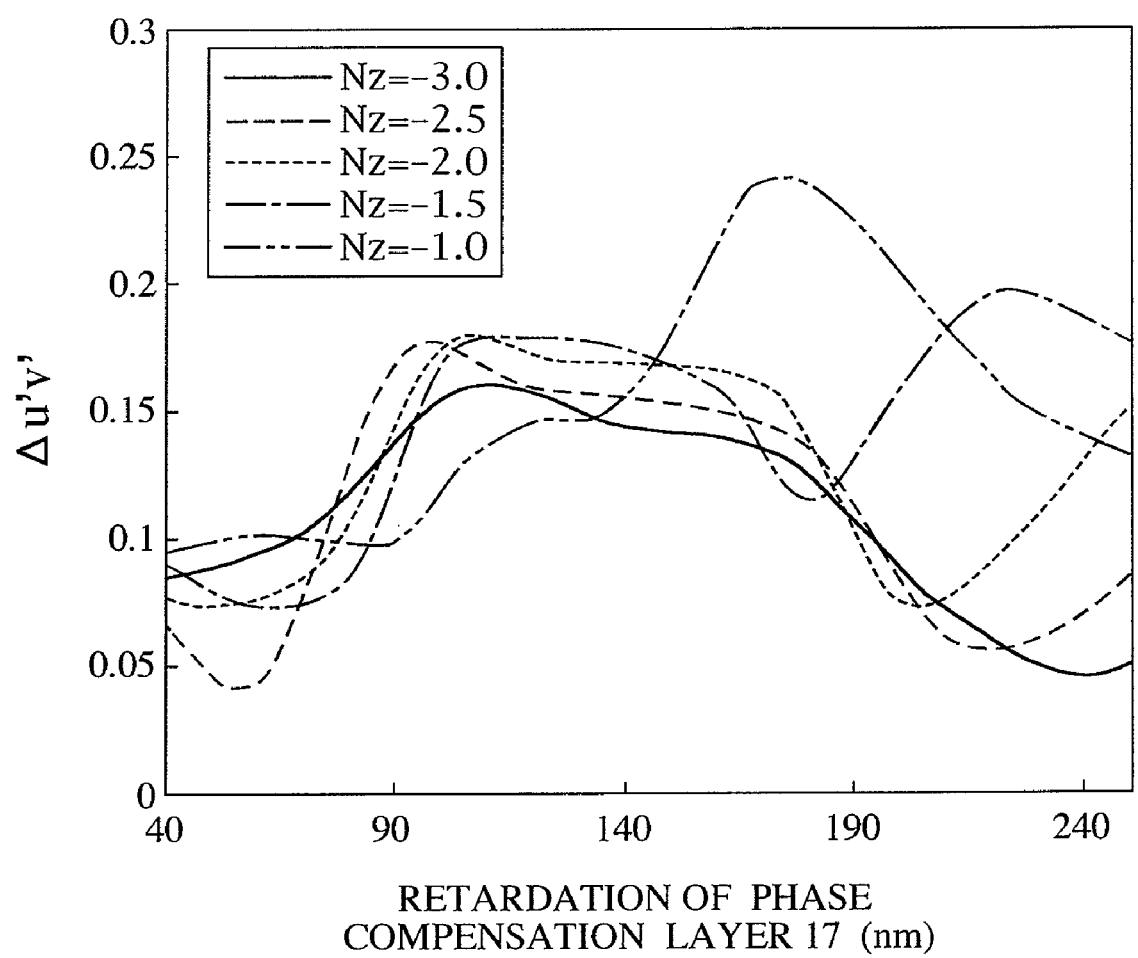
FIG. 24 is a characteristics diagram showing a further embodiment of a liquid crystal display device of the present invention.

Maximum transmittances attained in the present embodiment by changing the Nz coefficient and retardation value of the optical compensating member 17 in a range from −3 to −1 and a range from 40 to 250 nm, respectively, with the retardation value of the optical compensating member 16 fixed at 180 nm, are shown in FIG. 23, and Δu'v', in FIG. 24. A maximum transmittance of 2% or below is obtained in a retardation range of 40-200 nm, and favorable viewing-angle characteristics are realized. In addition, when the Nz coefficient and retardation value of the optical compensating member 17 are −1.0 and 135 nm, respectively, a maximum transmittance of 0.090% and a Δu'v' value of 0.15 are attained and particularly favorable results obtained. This Δu'v' value is therefore applied in the present embodiment.

Figure 22:
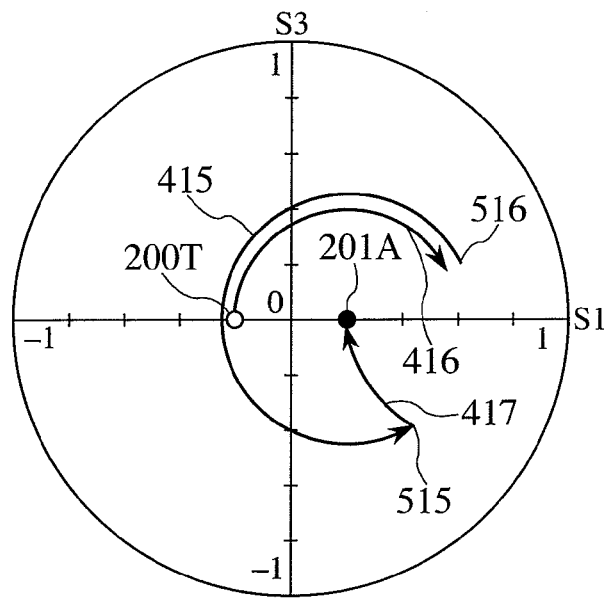
FIG. 22 is a further Poincare ball representation for explaining a liquid crystal display device of the present invention.

As can be seen from the polarization state changes in FIG. 22 and from the results in FIGS. 23, 24, an optimum retardation value of the optical compensating member 16 and an optimum Nz coefficient and optimum retardation value of the optical compensating member 17 depend upon the retardation value of the liquid-crystal layer and upon wavelength dispersion characteristics of these optical members. In addition, the results in the o-mode and the results obtained by positionally inverse arrangement of the liquid-crystal layer 15 and optical compensating member 16 in the optical configuration are substantially the same as obtained in the e-mode.

Fifth Embodiment

A structure of a fifth embodiment is shown in the left of FIG. 1, and an optical configuration of the e-mode, in FIG. 5. In the present embodiment, a negative "a-plate" is used as an optical compensating member 16, and another negative "a-plate" is used as an optical compensating member 17. This configuration makes it possible to achieve the polarization state changes shown in FIGS. 12A, 12B. A polarization state of light which has passed through a transmission axis 11BT of a polarizing layer 11B is denoted by 200T and undergoes a change 416 to be changed into a polarization state 516 by the optical compensating member 16. Next, the polarization state undergoes a change 415 to be changed into a polarization state 515 by a liquid-crystal layer 15 as if a history of the change 416 by the optical compensating member 16 were traced back. The polarization state further undergoes a change 417 into a polarization state 201A by the optical compensating member 17. When the retardation value of the optical compensating member 16 is 270 nm and the retardation value of the optical compensating member 17 is 90 nm, a maximum transmittance of 0.085% and a Δu'v' value of 0.13 are attained and particularly favorable results obtained. This Δu'v' value is therefore applied in the present embodiment.

As can be seen from the polarization state changes in FIGS. 12A, 12B, an optimum retardation value of the optical compensating member 16 and an optimum Nz coefficient and optimum retardation value of the optical compensating member 17 depend upon the retardation value of the liquid-crystal layer and upon wavelength dispersion characteristics of these optical members. In addition, the results in the o-mode and the results obtained by positionally inverse arrangement of the liquid-crystal layer 15 and optical compensating member 16 in the optical configuration are substantially the same as obtained in the e-mode.

Sixth Embodiment

Figure 26:
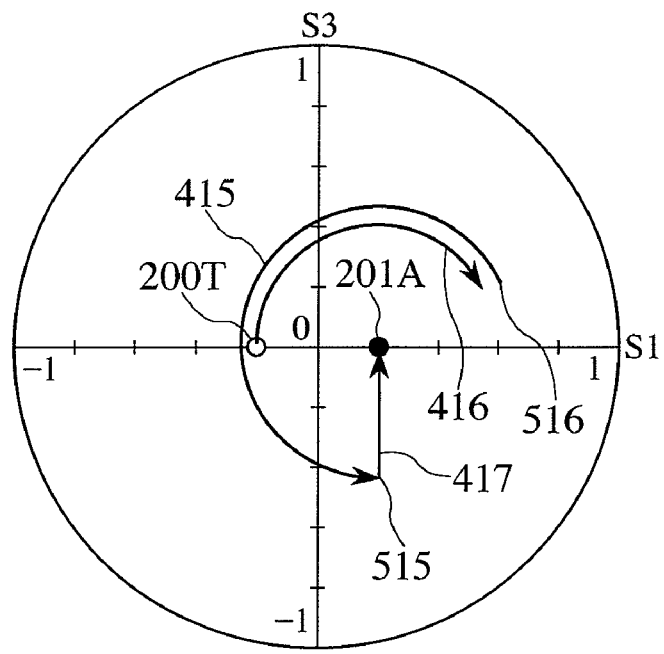
FIG. 26 is a further Poincare ball representation for explaining a liquid crystal display device of the present invention.

A structure of a sixth embodiment is shown in the left of FIG. 1, and an optical configuration of the e-mode, in FIG. 24. In the present embodiment, a negative "a-plate" is used as an optical compensating member 16, and a positive "c-plate" is used as an optical compensating member 17. This configuration makes it possible to achieve the polarization state changes shown in FIG. 26. A polarization state of light which has passed through a transmission axis 11BT of a polarizing layer 11B is denoted by 200T and undergoes a change 416 to be changed into a polarization state 516 by the optical compensating member 16. Next, the polarization state undergoes a change 415 to be changed into a polarization state 515 by a liquid-crystal layer 15 as if a history of the change 416 by the optical compensating member 16 were traced back. The polarization state further undergoes a change 417 into a polarization state 201A by the optical compensating member 17. When the retardation value of the optical compensating member 16 is 270 nm and the retardation value of the optical compensating member 17 is 90 nm, a maximum transmittance of 0.085% and a $\Delta u'v'$ value of 0.13 are attained and particularly favorable results obtained. This $\Delta u'v'$ value is therefore applied in the present embodiment.

As can be seen from the polarization state changes in FIGS. 12A, 12B, an optimum retardation value of the optical compensating member 16 and an optimum Nz coefficient and optimum retardation value of the optical compensating member 17 depend upon the retardation value of the liquid-crystal layer and upon wavelength dispersion characteristics of these optical members.

In addition, the results in the o-mode and the results obtained by positionally inverse arrangement of the liquid-crystal layer 15 and optical compensating member 16 in the optical configuration are substantially the same as obtained in the e-mode.

Seventh Embodiment

A structure of a seventh embodiment is shown in the left of FIG. 1, and an optical configuration of the e-mode, in FIG. 21. In the present embodiment, a negative "a-plate" is used as an optical compensating member 16, and a biaxially anisotropic optical compensating member with an Nz coefficient greater than 1 is used as an optical compensating member 17. This configuration makes it possible to achieve the polarization state changes shown in FIG. 27. A polarization state of light which has passed through a transmission axis 11BT of a polarizing layer 11B is denoted by 200T and undergoes a change 416 to be changed into a polarization state 516 by the optical compensating member 16. Next, the polarization state undergoes a change 415 to be changed into a polarization state 515 by a liquid-crystal layer 15 as if a history of the change 416 by the optical compensating member 16 were traced back. The polarization state further undergoes a change 417 into a polarization state 201A by the optical compensating member 17.

Figure 28:
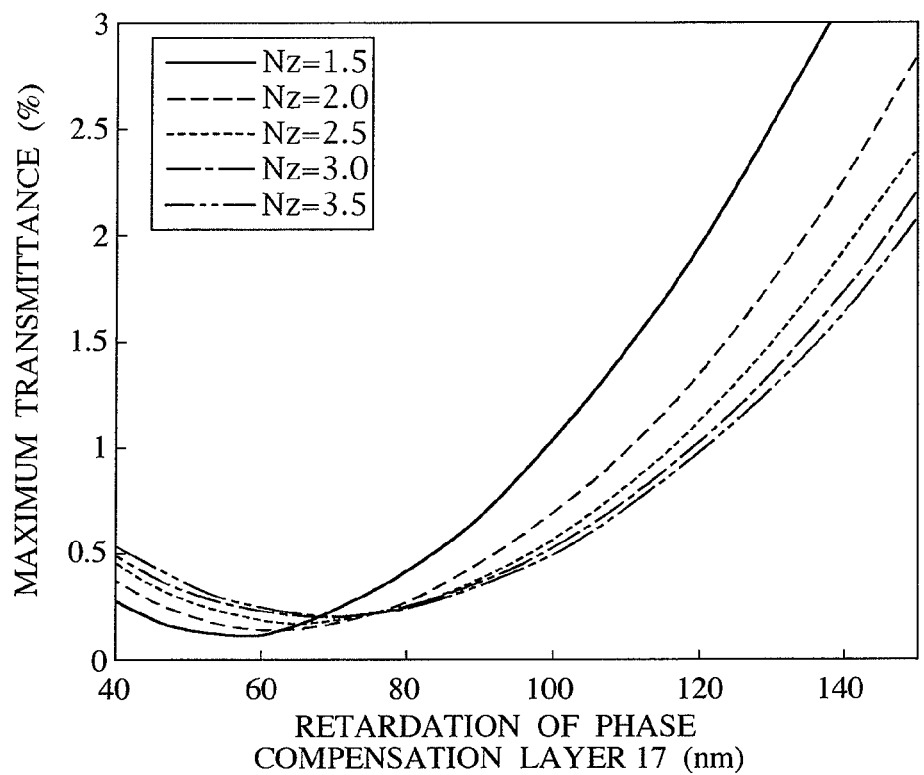
FIG. 28 is a characteristics diagram showing a further embodiment of a liquid crystal display device of the present invention.
Figure 29:
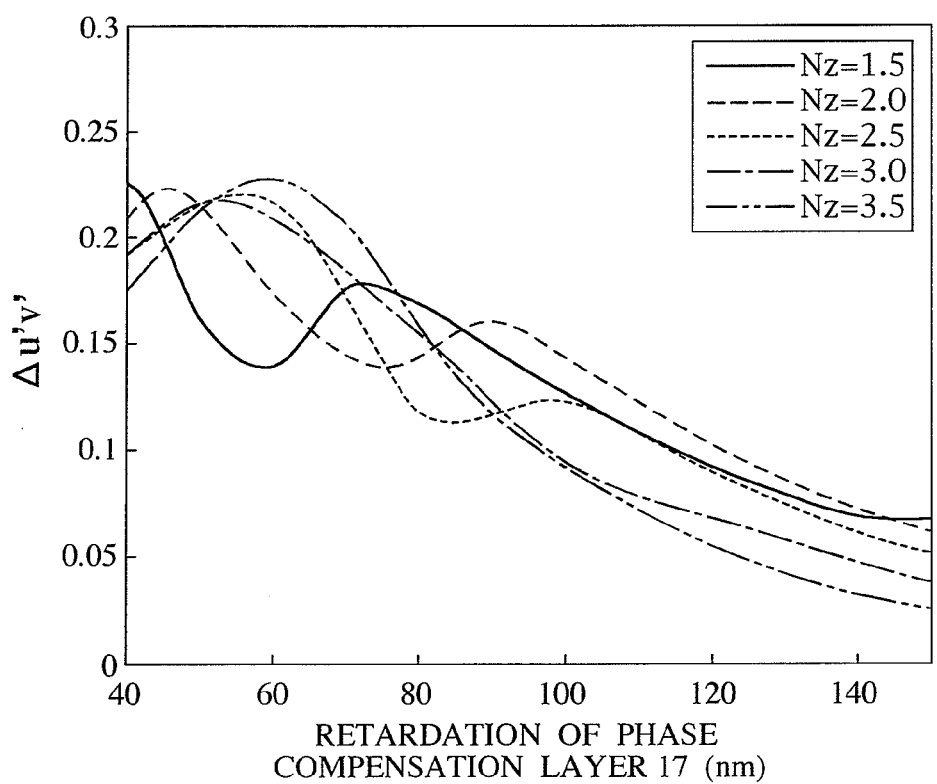
FIG. 29 is a characteristics diagram showing a further embodiment of a liquid crystal display device of the present invention.

Maximum transmittances attained in the present embodiment by changing the Nz coefficient and retardation value of the optical compensating member 17 in a range from 1.5 to 3.5 and a range from 40 to 150 nm, respectively, with the retardation value of the optical compensating member 16 fixed at 450 nm, are shown in FIG. 28, and $\Delta u'v'$, in FIG. 29. Maximum transmittances of 2% or below are obtained in a retardation range of 40-120 nm, and favorable viewing-angle characteristics are realized. In addition, when the Nz coefficient and retardation value of the optical compensating member 17 are 1.5 and 60 nm, respectively, a maximum transmittance of 0.11% and a $\Delta u'v'$ value of 0.14 are attained and particularly favorable results obtained. This $\Delta u'v'$ value is therefore applied in the present embodiment.

Figure 27:
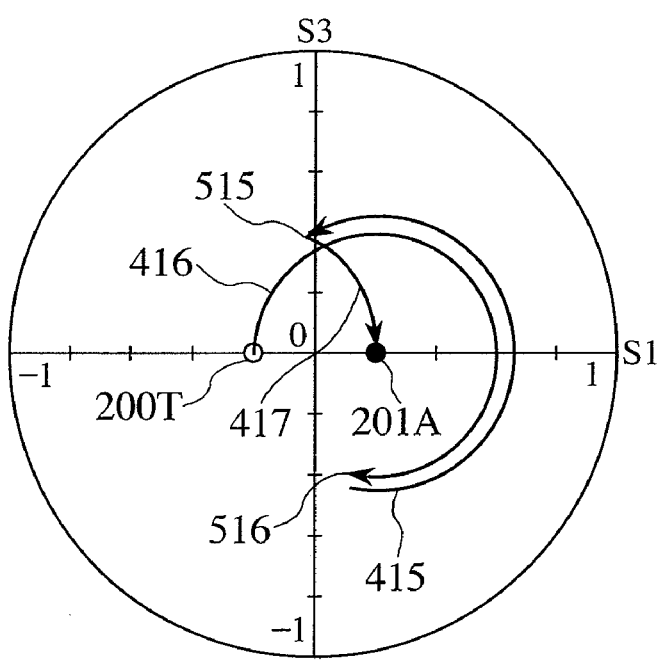
FIG. 27 is a further Poincare ball representation for explaining a liquid crystal display device of the present invention.

As can be seen from the polarization state changes in FIG. 27 and from the results shown in FIGS. 28 and 29, an optimum retardation value of the optical compensating member 16 and an optimum Nz coefficient and optimum retardation value of the optical compensating member 17 depend upon the retardation value of the liquid-crystal layer and upon wavelength dispersion characteristics of these optical members. In addition, the results in the o-mode and the results obtained by positionally inverse arrangement of the liquid-crystal layer 15 and optical compensating member 16 in the optical configuration are substantially the same as obtained in the e-mode.

Eighth Embodiment

A structure of an eighth embodiment is shown in the left of FIG. 1, and an optical configuration of the e-mode, in FIG. 21. In the present embodiment, a negative "a-plate" is used as an optical compensating member 16, and a biaxially anisotropic optical compensating member with an Nz coefficient greater than 0, but smaller than 1, is used as an optical compensating member 17. This configuration makes it possible to achieve the polarization state changes shown in FIG. 27. A polarization state of light which has passed through a transmission axis 11BT of a polarizing layer 11B is denoted by 200T and undergoes a change 416 to be changed into a polarization state 516 by the optical compensating member 16. Next, the polarization state undergoes a change 415 to be changed into a polarization state 515 by a liquid-crystal layer 15 as if a history of the change 416 by the optical compensating member 16 were traced back. The polarization state further undergoes a change 417 into a polarization state 201A by the optical compensating member 17.

Figure 30:
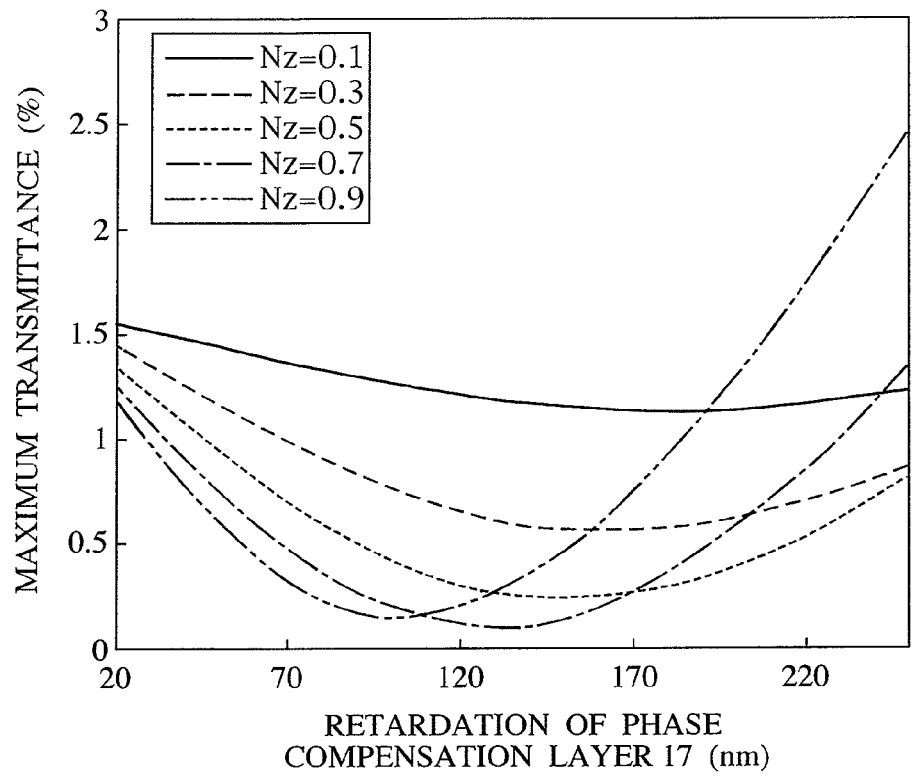
FIG. 30 is a characteristics diagram showing a further embodiment of a liquid crystal display device of the present invention.
Figure 31:
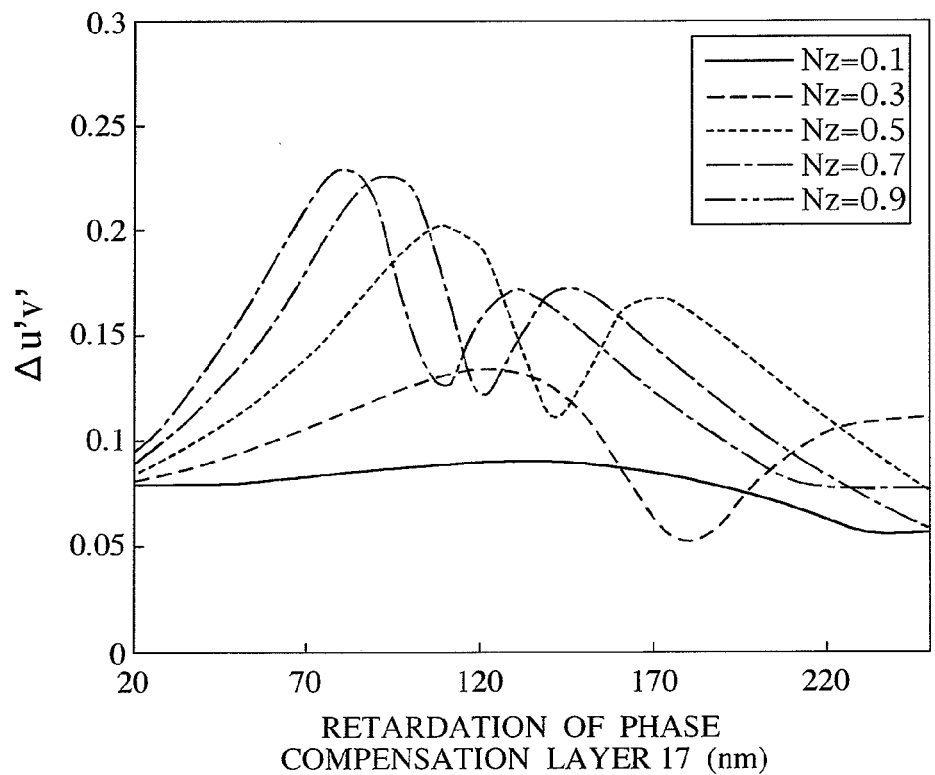
FIG. 31 is a characteristics diagram showing a further embodiment of a liquid crystal display device of the present invention.

Maximum transmittances attained in the present embodiment by changing the Nz coefficient and retardation value of the optical compensating member 17 in a range from 0.1 to 0.9 and a range from 20 to 250 nm, respectively, with the retardation value of the optical compensating member 16 fixed at 420 nm, are shown in FIG. 30, and $\Delta u'v'$, in FIG. 31. Maximum transmittances of 2% or below are obtained in a retardation range of 20-220 nm, and favorable viewing-angle characteristics are realized. In addition, when the Nz coefficient and retardation value of the optical compensating member 17 are 0.7 and 130 nm, respectively, a maximum transmittance of 0.088% and a $\Delta u'v'$ value of 0.15 are attained and particularly favorable results obtained. This $\Delta u'v'$ value is therefore applied in the present embodiment.

As can be seen from the polarization state changes in FIG. 27 and from the results shown in FIGS. 30, 31, an optimum retardation value of the optical compensating member 16 and an optimum Nz coefficient and optimum retardation value of the optical compensating member 17 depend upon the retardation value of the liquid-crystal layer and upon wavelength dispersion characteristics of these optical members. In addition, the results in the o-mode and the results obtained by positionally inverse arrangement of the liquid-crystal layer 15 and optical compensating member 16 in the optical configuration are substantially the same as obtained in the e-mode.

Ninth Embodiment

A structure of a ninth embodiment is shown in the left of FIG. 1, and an optical configuration of the e-mode, in FIG. 5. In the present embodiment, a negative "a-plate" is used as an optical compensating member 16, and a biaxially anisotropic optical compensating member with an Nz coefficient greater than 1 is used as an optical compensating member 17. This configuration makes it possible to achieve the polarization state changes shown in FIG. 32. A polarization state of light which has passed through a transmission axis 11BT of a polarizing layer 11B is denoted by 200T and undergoes a change 416 to be changed into a polarization state 516 by the optical compensating member 16. Next, the polarization state undergoes a change 415 to be changed into a polarization state 515 by a liquid-crystal layer 15 as if a history of the change 416 by the optical compensating member 16 were traced back. The polarization state further undergoes a change 417 into a polarization state 201A by the optical compensating member 17.

Figure 33:
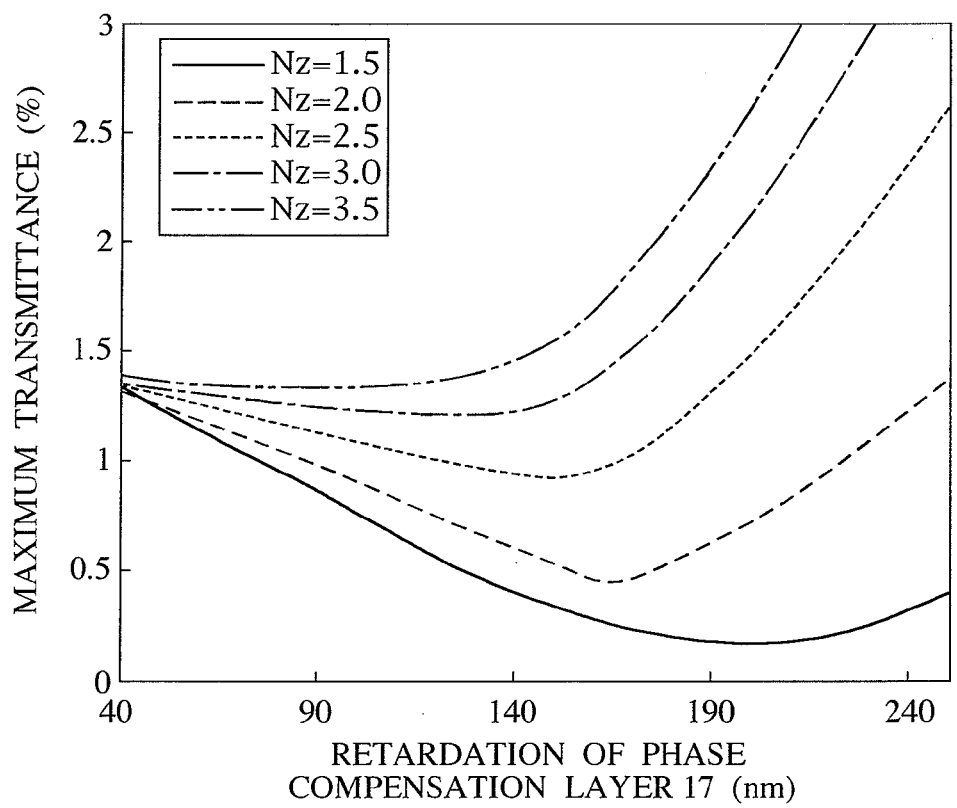
FIG. 33 is a characteristics diagram showing a further embodiment of a liquid crystal display device of the present invention.
Figure 34:
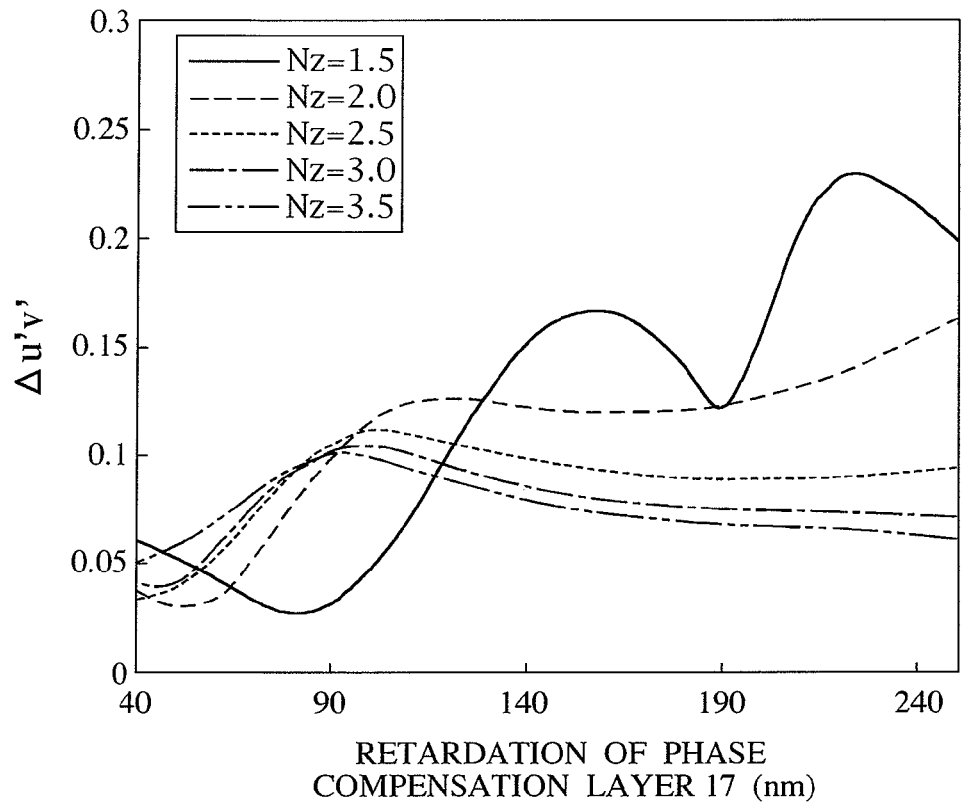
FIG. 34 is a characteristics diagram showing a further embodiment of a liquid crystal display device of the present invention.

Maximum transmittances attained in the present embodiment by changing the Nz coefficient and retardation value of the optical compensating member 17 in a range from 1.5 to 3.5 and a range from 40 to 250 nm, respectively, with the retardation value of the optical compensating member 16 fixed at 580 nm, are shown in FIG. 33, and Δu'v', in FIG. 34. Maximum transmittances of 2% or below are obtained in a retardation range of 40-180 nm, and favorable viewing-angle characteristics are realized. In addition, when the Nz coefficient and retardation value of the optical compensating member 17 are 2 and 135 nm, respectively, a maximum transmittance of 0.095% and a Δu'v' value of 0.14 are attained and particularly favorable results obtained. This Δu'v' value is therefore applied in the present embodiment.

Figure 32:
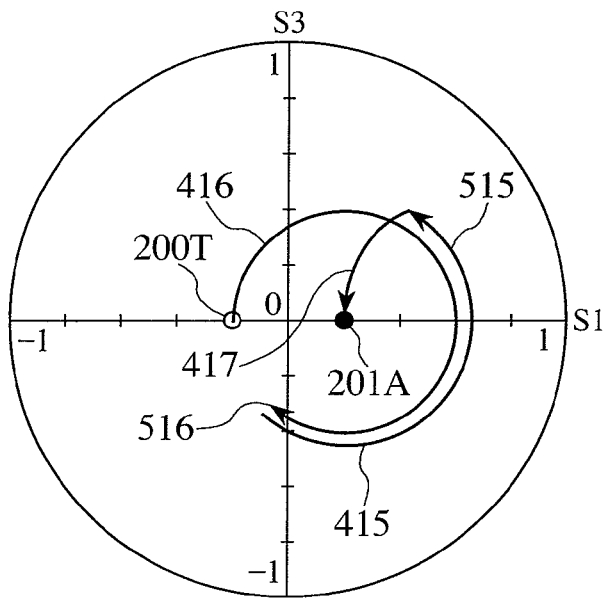
FIG. 32 is a further Poincare ball representation for explaining a liquid crystal display device of the present invention.

As can be seen from the polarization state changes in FIG. 32 and from the results shown in FIGS. 33, 34, an optimum retardation value of the optical compensating member 16 and an optimum Nz coefficient and optimum retardation value of the optical compensating member 17 depend upon the retardation value of the liquid-crystal layer and upon wavelength dispersion characteristics of these optical members. In addition, the results in the o-mode and the results obtained by positionally inverse arrangement of the liquid-crystal layer 15 and optical compensating member 16 in the optical configuration are substantially the same as obtained in the e-mode.

Tenth Embodiment

A structure of a tenth embodiment is shown in the left of FIG. 1, and an optical configuration of the e-mode, in FIG. 21. In the present embodiment, a negative "a-plate" is used as an optical compensating member 16, and a positive "a-plate" is used as an optical compensating member 17. This configuration makes it possible to achieve the polarization state changes shown in FIG. 27. A polarization state of light which has passed through a transmission axis 11BT of a polarizing layer 11B is denoted by 200T and undergoes a change 416 to be changed into a polarization state 516 by the optical compensating member 16. Next, the polarization state undergoes a change 415 to be changed into a polarization state 515 by a liquid-crystal layer 15 as if a history of the change 416 by the optical compensating member 16 were traced back. The polarization state further undergoes a change 417 into a polarization state 201A by the optical compensating member 17.

When the retardation value of the optical compensating member 16 as a phase-compensating layer is 440 nm, and the retardation value of the optical compensating member 17 as another phase-compensating layer is 80 nm, a maximum transmittance of 0.11% and a Δu'v' value of 0.12 are attained and particularly favorable results obtained. This Δu'v' value is therefore applied in the present embodiment.

As can be seen from the polarization state changes in FIG. 27, an optimum retardation value of the optical compensating member 16 and an optimum Nz coefficient and optimum retardation value of the optical compensating member 17 depend upon the retardation value of the liquid-crystal layer and upon wavelength dispersion characteristics of these optical members. In addition, the results in the o-mode and the results obtained by positionally inverse arrangement of the liquid-crystal layer 15 and optical compensating member 16 in the optical configuration are substantially the same as obtained in the e-mode.

Eleventh Embodiment

Figure 25:
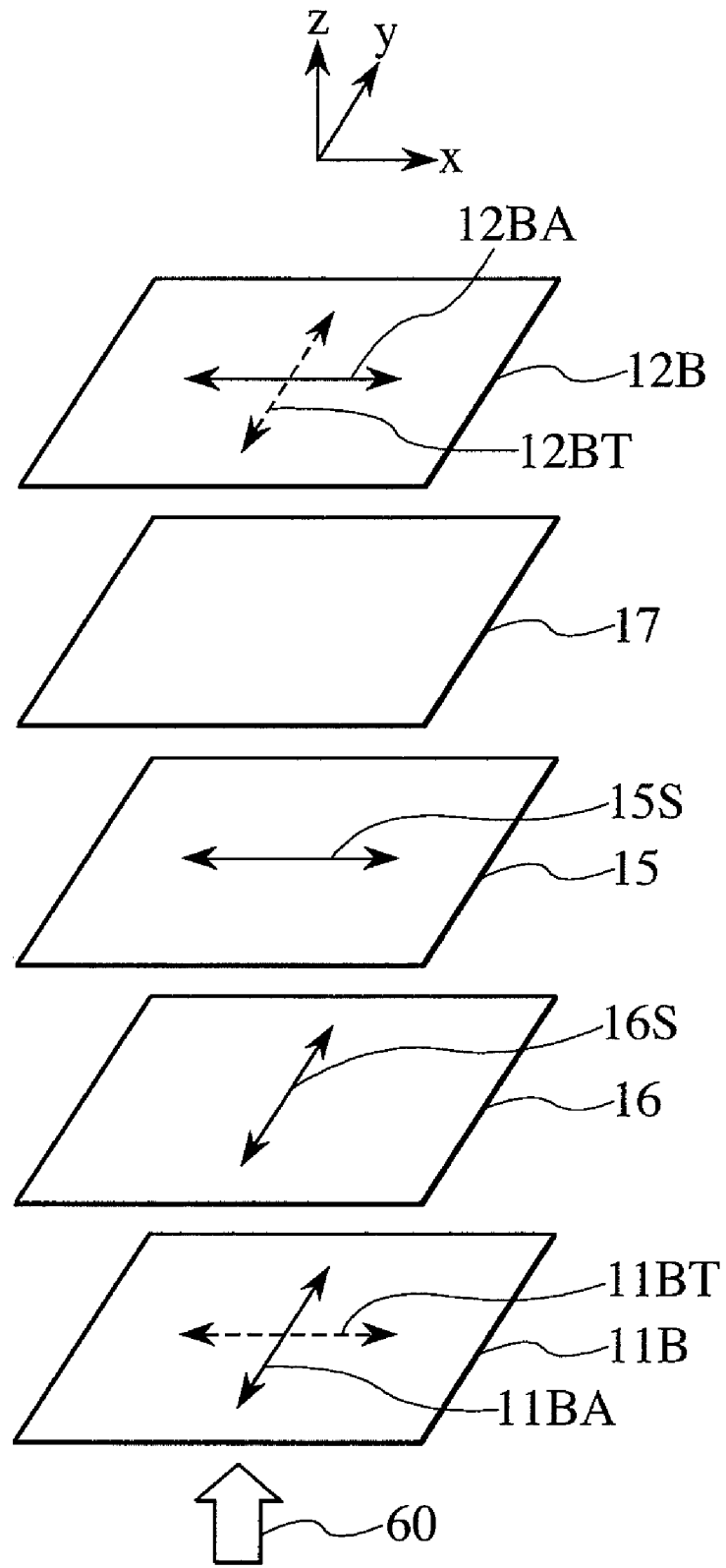
FIG. 25 is a configuration diagram for showing a further embodiment of a liquid crystal display device of the present invention.
Figure 35:
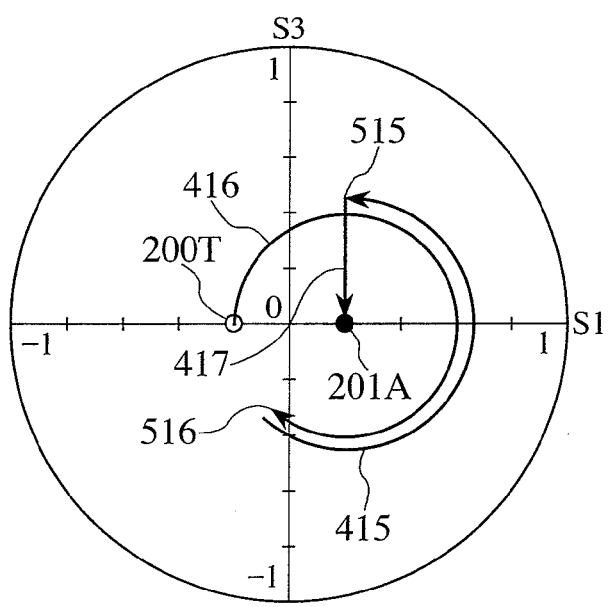
FIG. 35 is a further Poincare ball representation for explaining a liquid crystal display device of the present invention.

A structure of an eleventh embodiment is shown in the left of FIG. 1, and an optical configuration of the e-mode, in FIG. 25. In the present embodiment, a negative "a-plate" is used as an optical compensating member 16, and a negative "c-plate" is used as an optical compensating member 17. This configuration makes it possible to achieve the polarization state changes shown in FIG. 35. A polarization state of light which has passed through a transmission axis 11BT of a polarizing layer 11B is denoted by 200T and undergoes a change 416 to be changed into a polarization state 516 by the optical compensating member 16. Next, the polarization state undergoes a change 415 to be changed into a polarization state 515 by a liquid-crystal layer 15 as if a history of the change 416 by the optical compensating member 16 were traced back. The polarization state further undergoes a change 417 into a polarization state 201A by the optical compensating member 17.

When the retardation value of the optical compensating member 16 as a phase-compensating layer is 480 nm, and the retardation value of the optical compensating member 17 as another phase-compensating layer is 80 nm, a maximum transmittance of 0.094% and a Δu'v' value of 0.13 are attained and particularly favorable results obtained. This Δu'v' value is therefore applied in the present embodiment.

As can be seen from the polarization state changes in FIG. 27, an optimum retardation value of the optical compensating member 16 and an optimum Nz coefficient and optimum retardation value of the optical compensating member 17 depend upon the retardation value of the liquid-crystal layer and upon wavelength dispersion characteristics of these optical members. In addition, the results in the o-mode and the results obtained by positionally inverse arrangement of the liquid-crystal layer 15 and optical compensating member 16 in the optical configuration are substantially the same as obtained in the e-mode.

While the invention has been described in its preferred embodiments, it is to be understood that the words which have been used are words of description rather than limitation and that changes within the purview of the appended claims may be made without departing from the true scope and spirit of the invention in its broader aspects.

What is claimed is:

1. A liquid crystal display device comprising:
   a first substrate with a first polarizing layer at an incident side of light;
   a second substrate with a second polarizing layer which includes an absorption axis such that the smaller of two angles formed with respect to the absorption axis of the first polarizing layer ranges from 88° to 90°;
   a liquid-crystal layer on which liquid-crystal molecules are oriented such that the smaller of two angles formed with respect to the first substrate or the second substrate ranges from 0° to 5°, and such that the smaller of two angles formed with respect to the absorption axis of the first polarizing layer ranges from 88° to 90° or the smaller of two angles formed ranges from 0° to 2°;
   a matrix-driven electrode group with one pair of electrodes arranged on a pixel-by-pixel basis at a side close to the liquid-crystal layer, on either the first substrate or the second substrate; and
   a rear-illuminating device;
   wherein:
   between the first polarizing layer and the liquid-crystal layer, a first optical compensating member is disposed without a birefringent medium sandwiched between the liquid-crystal layer and the first optical compensating member;
   the first optical compensating member is constructed so that when a refractive index thereof in a slow-axis direction in a plane parallel to the substrate is taken as n1, a refractive index in a fast-axis direction in the plane parallel to the substrate is taken as n2, and a refractive index in a thickness direction is taken as n3, the first optical compensating member satisfies n1≈n3>n2;
   a slow axis of the first optical compensating member in the plane parallel to the substrate is substantially vertical to an optical axis of the liquid-crystal layer;
   color filters for an N number of colors (N≧2) are provided on the first substrate or the second substrate; and
   when wavelengths that denote maximum transmittance values of the color filters are each expressed as $\lambda_M$ (M=1, 2, etc., up to N) in order with the shortest of the wavelengths first, if a difference between an extraordinary-light refractive index and ordinary-light refractive index at the $\lambda_M$ of the liquid-crystal layer that is associated with the color filter having the wavelength $\lambda_M$ which denotes one of the maximum transmittance values, is taken as $\Delta nLC(\lambda_M)$, and thickness, as $dLC_M$, and a refractive index in the slow-axis direction in a plane parallel to the associated substrate, at the $\lambda_M$ of the first optical compensating member that is associated with the color filter having the wavelength $\lambda_M$ which denotes one of the maximum transmittance values, is taken as $n1(\lambda_M)$, a refractive index in the fast-axis direction in the substrate parallel plane is taken as $n2(\lambda_M)$, and thickness is taken as $dr_M$, $$|\Delta nLC(\lambda_{M-1}) \cdot dLC_{M-1} - (n1(\lambda_{M-1}) - n2(\lambda_{M-1})) \cdot dr_{M-1}|/|\Delta nLC(\lambda_M) \cdot dLC_M - (n1(\lambda_M) - n2(\lambda_M)) \cdot dr_M| < (0.9 + 0.04/\lambda_{M-1}^2 + 0.0008/\lambda_{M-1}^4)/(0.9 + 0.04/\lambda_M^2 + 0.0008/\lambda_M^4)$$

is satisfied for all M's (M=1, 2, etc., up to N).

2. A liquid crystal display device comprising:
   a first substrate with a first polarizing layer at an incident side of light;
   a second substrate with a second polarizing layer which includes an absorption axis such that the smaller of two angles formed with respect to the absorption axis of the first polarizing layer ranges from 88° to 90°;
   a liquid-crystal layer on which liquid-crystal molecules are oriented such that the smaller of two angles formed with respect to the first substrate or the second substrate ranges from 0° to 5°, and such that the smaller of two angles formed with respect to the absorption axis of the first polarizing layer ranges from 88° to 90° or the smaller of two angles formed ranges from 0° to 2°;
   a matrix-driven electrode group with one pair of electrodes arranged on a pixel-by-pixel basis at a side close to the liquid-crystal layer, on either the first substrate or the second substrate; and
   a rear-illuminating device;
   wherein:
   between the first polarizing layer and the liquid-crystal layer, a first optical compensating member is disposed without a birefringent medium sandwiched between the liquid-crystal layer and the first optical compensating member;
   the first optical compensating member is constructed so that when a refractive index thereof in a slow-axis direction in a plane parallel to the substrate is taken as n1, a refractive index in a fast-axis direction in the plane parallel to the substrate is taken as n2, and a refractive index in a thickness direction is taken as n3, the first optical compensating member satisfies n1≈n3>n2;
   a slow axis of the first optical compensating member in the plane parallel to the substrate is substantially vertical to an optical axis of the liquid-crystal layer;
   the optical axis of the liquid-crystal layer is substantially vertical to an absorption axis of the first polarizing layer;
   a second optical compensating member is disposed between the second polarizing layer and the liquid-crystal layer;
   if a wavelength of incident light is 550 nm, a difference between an extraordinary-light refractive index of the liquid-crystal layer and an ordinary-light refractive index thereof is expressed as ΔnLC, and a cell gap, as dLC; and
   when the refractive index of the first optical compensating member in the slow-axis direction thereof in the substrate parallel plane is taken as n1, the refractive index of the first optical compensating member in the fast-axis direction thereof in the substrate parallel plane is taken as n2, and thickness of the first optical compensating member is taken as dr;

$$0 \text{ nm} < \Delta nLC \cdot dLC - (n1-n2) \cdot dr < 275 \text{ nm}$$

is satisfied; and
   the second optical compensating member satisfies n3>n1≈n2.

3. A comprising:
   a first substrate with a first polarizing layer at an incident side of light;
   a second substrate with a second polarizing layer which includes an absorption axis such that the smaller of two angles formed with respect to the absorption axis of the first polarizing layer ranges from 88° to 90°;
   a liquid-crystal layer on which liquid-crystal molecules are oriented such that the smaller of two angles formed with respect to the first substrate or the second substrate ranges from 0° to 5°, and such that the smaller of two angles formed with respect to the absorption axis of the first polarizing layer ranges from 88° to 90° or the smaller of two angles formed ranges from 0° to 2°.

a matrix-driven electrode group with one pair of electrodes arranged on a pixel-by-pixel basis at a side close to the liquid-crystal layer, on either the first substrate or the second substrate; and a rear-illuminating device;

wherein:

between the first polarizing layer and the liquid-crystal layer, a first optical compensating member is disposed without a birefringent medium sandwiched between the liquid-crystal layer and the first optical compensating member;

the first optical compensating member is constructed so that when a refractive index thereof in a slow-axis direction in a plane parallel to the substrate is taken as n1, a refractive index in a fast-axis direction in the plane parallel to the substrate is taken as n2, and a refractive index in a thickness direction is taken as n3, the first optical compensating member satisfies n1≈n3>n2;

a slow axis of the first optical compensating member in the plane parallel to the substrate is substantially vertical to an optical axis of the liquid-crystal layer;

the optical axis of the liquid-crystal layer is substantially vertical to an absorption axis of the first polarizing layer;

a second optical compensating member is disposed between the second polarizing layer and the liquid-crystal layer;

if a wavelength of incident light is 550 nm, a difference between an extraordinary-light refractive index of the liquid-crystal layer and an ordinary-light refractive index thereof is expressed as $\Delta nLC$, and a cell gap, as $dLC$, and when the refractive index of the first optical compensating member in the slow-axis direction thereof in the substrate parallel plane is taken as n1, the refractive index of the first optical compensating member in the fast-axis direction thereof in the substrate parallel plane is taken as n2, and thickness of the first optical compensating member is taken as dr, $$-275 \text{ nm} < \Delta nLC \cdot dLC - (n1-n2) \cdot dr < 0 \text{ nm}$$

is satisfied; and the second optical compensating member satisfies n1≈n2>n3.

* * * * *